(12) United States Patent
Fuerst et al.

(10) Patent No.: US 8,019,915 B2
(45) Date of Patent: Sep. 13, 2011

(54) METHOD AND DEVICE FOR CONTROLLING ACCESS TO MULTIPLE APPLICATIONS

(75) Inventors: Lars Eric Fuerst, Hannover (DE); Ralf Einhorn, Hannover (DE); Carsten Herpel, Wennigsen (DE); Ralf Koehler, Hannover (DE)

(73) Assignee: Tixel GmbH, Hannover (DE)

( * ) Notice: Subject to any disclaimer, the term of this patent is extended or adjusted under 35 U.S.C. 154(b) by 152 days.

(21) Appl. No.: 12/450,853

(22) PCT Filed: Apr. 9, 2008

(86) PCT No.: PCT/EP2008/054310
§ 371 (c)(1),
(2), (4) Date: Oct. 15, 2009

(87) PCT Pub. No.: WO2008/125575
PCT Pub. Date: Oct. 23, 2008

(65) Prior Publication Data
US 2010/0138569 A1 Jun. 3, 2010

(30) Foreign Application Priority Data
Apr. 16, 2007 (EP) .................................... 07106251

(51) Int. Cl.
*G06F 3/00* (2006.01)
*G06F 15/00* (2006.01)
(52) U.S. Cl. .......................................... 710/36; 712/11
(58) Field of Classification Search .................... 710/36; 712/11
See application file for complete search history.

(56) References Cited

U.S. PATENT DOCUMENTS

| 5,619,733 | A | * | 4/1997 | Noe et al. .......................... 710/61 |
| 5,642,477 | A | * | 6/1997 | de Carmo et al. ............. 715/203 |
| 5,664,226 | A | * | 9/1997 | Czako et al. .................... 710/52 |
| 5,832,309 | A | * | 11/1998 | Noe et al. ......................... 710/61 |
| 6,707,831 | B1 | * | 3/2004 | Fetzer et al. ................... 370/537 |
| 7,185,174 | B2 | | 2/2007 | Stewart et al. | |
| 2008/0147646 | A1 | * | 6/2008 | Jaschek et al. ..................... 707/5 |

OTHER PUBLICATIONS

Search Report Dated Jul. 3, 2008.

* cited by examiner

*Primary Examiner* — Henry W Tsai
*Assistant Examiner* — Hyun Nam
(74) *Attorney, Agent, or Firm* — Howard IP Law Group, P.C.

(57) ABSTRACT

The invention relates to a method and a device for controlling access to multiple applications which are each implemented as a client application in an operating system environment of a data processing device from a shared memory system. The problem addressed by the invention is that of providing an improved method and an improved device for controlling access to multiple applications which are each implemented as a client application in an operating system environment of a data processing device from a shared memory system, which allow an efficient exchange of data for input/output. In particular, interaction with multimedia data in such an operating environment should be optimized. The invention comprises the details of a method for controlling access to multiple applications which are each implemented as a client application in an operating system environment of a data processing device from a shared memory system which is constructed in the form of multiple memory blocks in the operating system environment, which are each assigned to one of the client applications.

13 Claims, 11 Drawing Sheets

METHOD AND DEVICE FOR CONTROLLING ACCESS TO MULTIPLE APPLICATIONS

Figure 1:
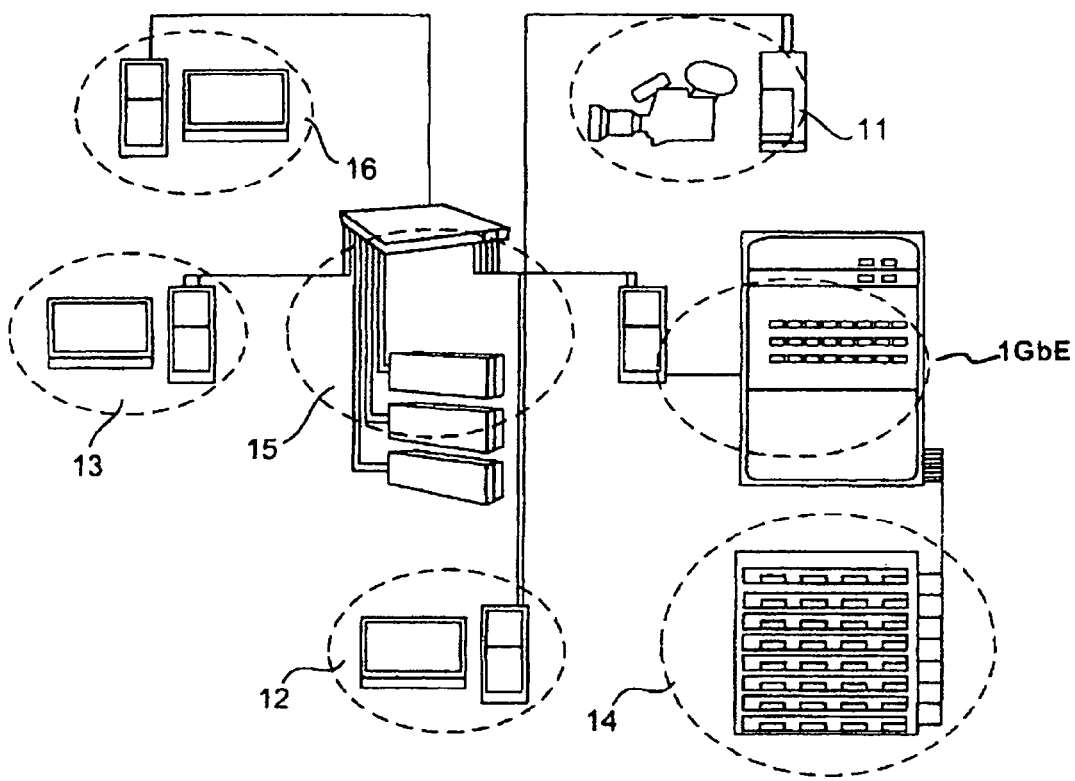

This application claims the benefit, under 35 U.S.C. §365 of International Application PCT/EP2008/054310, filed Apr. 9, 2008, which was published in accordance with PCT Article 21(2) on Oct. 23, 2008 in German and which claims the benefit of European patent application No. 07106251.7, filed Apr. 16, 2007.

The invention relates to a method and an apparatus for controlling the access by a plurality of applications, which are respectively implemented as an application client in an operating system environment of a data processing device, to a shared storage system.

PRIOR ART

Such methods and apparatuses are used in the digital post-production of cinema films, for example, which is becoming increasingly significant within professional film production. The demands on current productions in relation to computer-generated effects and high-resolution images are increasing continually. In the meantime, entire films are being produced from computer animations, and resolutions of up to 4096× 3112 pixels are standard while the material is being produced. The new distribution media such as Blu-ray discs are bringing films in HD quality (1920×1080) to the living room. As the demands increase, so too do the requirements for the hardware and software which are used in this production environment. Since uncompressed video data with a depth of color of up to 16 bits are used, data rates of up to 1 gigabyte per second are needed for realtime tasks, such as recording or playback of video sequences. Accordingly, it is also necessary to manage immense volumes of data efficiently during a production. During the production of a 90-minute cinema film, on average 100 terabytes of data are produced, since far more is recorded than is ultimately used.

To meet these requirements, storage area networks are used. Storage area networks allow direct access by a plurality of application clients, for example PC-clients, to a large, central storage system. Even relatively small systems allow data rates in the region of 1 gigabyte per second. This means that all clients which are connected to a storage area network have unrestricted access to the image material stored therein. This is necessary, since many tasks are performed with as much parallelism as possible for efficiency and cost reasons. However, this results in a problem, since although storage area networks can be just as powerful as a directly connected storage system ("Direct Attached Storage") in the case of exclusive access, as soon as a plurality of application clients compete for access the system does not perform scaling and loses performance to an enormous degree. This is very critical particularly in the case of realtime applications. There is therefore a need for optimization measures in the form of coordination of the I/O requests and the possibility of handling realtime applications in prioritized fashion.

The use of storage area networks is increasing in cinema film production. The logistical advantages of the centralized storage of film material are opposed by the disadvantages in the form of lack of scalability and the absence of "Quality of Service" (QoS) mechanisms. The prerequisites for efficient use of a storage area network in the digital postproduction of film material must be attached not only to the maximum available bandwidth in the storage area network but also to the possibility of making said bandwidth available to a plurality of clients in parallel. The text which follows provides a more detailed explanation of the prior art and demonstrates the associated problems.

The cinema, television and advertising film industry is undergoing change. Particularly the high demand for storage, the demands on data rate and the pursuit of optimization of the production process are advancing the development. The sector is anxious to minimize production time and, in direct association therewith, the production costs. Storage systems which are available to just one computer in dedicated fashion ("Direct Attached Storage") and hence require the data to be copied from a central memory are being replaced by storage area networks. Storage area networks permit distributed working and render time-consuming copying superfluous. Hard-disk-based storage systems afford a high level of performance capability for sequential access. The application background accommodates this property, since video data are usually read and written successively as a stream.

As soon as a plurality of clients compete for access to a storage area network, however, the performance of the system decreases rapidly, since the read and write heads of the hard disks need to be moved to the requested data. These head movements are very time-consuming in comparison with the actual read or write operation and are therefore avoided if possible. On local hard disks, an I/O scheduler at operating system level ensures that such head skips are minimized. When the storage area network is being used, however, a plurality of systems access a shared resource independently and without knowledge of one another. In the case of time-critical applications, there is a need for one or more application clients to be provided with a guaranteed minimum bandwidth, which is not possible in the case of uncoordinated access by the individual clients.

FIG. 1 shows fundamental components for the various areas of digital image processing. Acquisition 11 ("Ingest"), playback 12 ("Playout") and online processing 13 of the film material are some of the time-critical tasks. The calculation of the image sequences 14 ("Rendering") is time-consuming but has no realtime requirements. To limit the access to a storage area network 15 (SAN) to a few clients, the computation nodes are therefore cascaded via gateways. It is therefore possible for an SAN client to provide a plurality of render machines with data using cheap standard network technology (1 GbE) without the administration complexity becoming too great for the administrator 16 ("Operator").

The text below first of all provides a general discussion of the relevant parts of the infrastructure of a modern postproduction facility. This is the area which is shown in FIG. 1. The individual components are explained together with their performance-related parameters.

Figure 2:
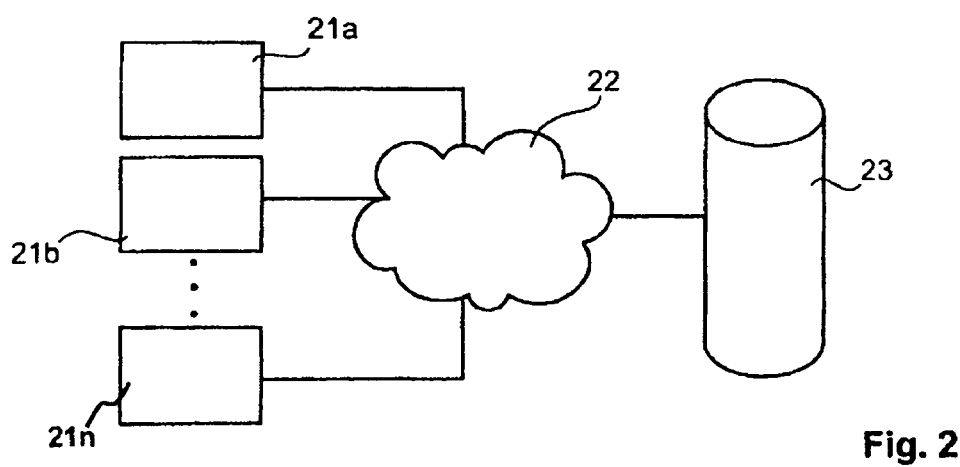
Figure 3:
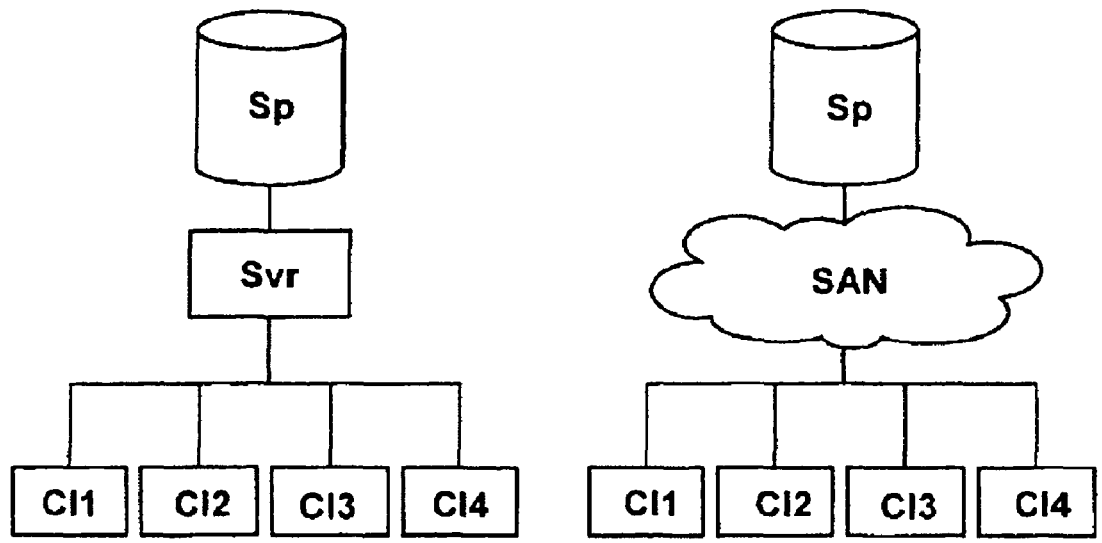

FIG. 2 shows a highly simplified system overview. An easily manageable number of clients 21a, 21b, . . . has access to a storage subsystem 23 ("Storage") via a storage area network 22 (SAN). The link is made via broadband networks which are capable of providing high data rates. To date, these have not been standard IT networks such as Gigabit Ethernet but rather special technologies, which are presented in the next section. A storage area network is the interface between PC clients and a storage subsystem. In this case, there is no central server instance, as is the case with "Network Attached Storage" (NAS) systems, which undertakes the management of the storage subsystem. The advantage of an SAN system over NAS systems is the way in which the memory is accessed. The data transmission in the case of NAS systems is effected via a server which manages the disk subsystem. That is to say that the data need to be transferred by this system. A storage area network dispenses with the server, and the clients can access the storage subsystem directly. FIG. 3 illustrates this circumstance. On the left-hand side, a memory (Sp) is connected to clients C11-C14 via a server Svr. On the right-hand side, a memory Sp is connected to clients C11-C14 via a storage area network SAN.

SAN systems involve the use of various transmission technologies, which are presented briefly below.

An SCSI SAN connects a storage subsystem to a PC client via a parallel bus. On an SCSI bus, up to 16 devices can be connected to one another, depending on the protocol variant. The connection is made either by means of conductor tracks on a board or by cable. The data are transmitted using the SCSI protocol. The use of SCSI for the design of a storage area network is limited by the range, which is 25 meters maximum.

"Fiber Channel" is a technology which has been developed specifically for SAN environments. Consequently, the "Fiber Channel" transmission technology is used in most large SAN systems. In this case, the transmission is effected serially using the SCSI protocol. In contrast to SCSI, "Fiber Channel" allows optical fibers to be used to bridge greater distances. In addition, the transmission protocol is implemented in the hardware interfaces, so that short latencies are achieved. A further advantage is higher data rates of up to 4 Gbit/s per "Fiber Channel" connection.

Three topologies are available for the design of a "Fiber Channel" SAN environment: point-to-point, "Arbitrary Loop" and "Fabric".

The simplest method is the point-to-point topology. In this topology, a storage subsystem is connected directly to a client. In the case of an "Arbitrary Loop", a plurality of clients can be connected to the storage subsystem. All devices are linked together to form a ring. In this topology, up to 126 devices can be incorporated, but only two devices ever interchange data with one another at the same time and in one direction. The "Fabric" topology is used most often. In theory, a "Fabric" can combine up to 15.5 million terminals using "Fiber Channel Switches". All terminals which are connected to a switch have the full bandwidth. The number of "Fiber Channel" ports within a "Fabric" can be increased by coupling a plurality of switches. For this, "Fiber Channel Switches" have inter-switch links. The organization within a fabric is effected using ways known as "Zoning". All clients which are able to communicate with one another need to belong to a common zone. The stipulation of the zones is configured in the "Fiber Channel Switch".

For the data transmission within a "Fiber Channel" network, the bits are passed to the line serially. In the point-to-point and "Fabric" topologies, data at this data rate can also be transmitted bidirectionally. The possible length of the transmission link is dependent on the transmission medium used. The standard provides both copper cable and optical fibers for the transmission.

The iSCSI SAN is based on a similar concept to "Fiber Channel". Instead of a parallel SCSI bus, a serial medium is used. The transmission likewise uses the SCSI protocol, but this protocol is not used for direct transmission but rather is encapsulated in the TCP/IP protocol. Thus, instead of special network hardware, it is possible to use standard Ethernet technology (10 GbE), which is an advantage particularly from the point of view of cost. In addition, it is also possible to incorporate existing Ethernet infrastructures. The disadvantage is the encapsulation of the SCSI protocol into the TCP/IP protocol and the associated protocol overhead. Furthermore, the TCP/IP protocol places a very large burden on the CPU for high level data transfer. The design of an iSCSI SAN should therefore resort to network cards which have implemented the TCP/IP protocol in hardware.

Infiniband is a transmission technology which is likewise based on serial transmission. It was originally developed to replace the PCI bus within a PC system. In the meantime, Infiniband is being used not only in computer clusters but also increasingly in SAN environments. The protocol stack likewise supports the SCSI protocol, but also the TCP/IP protocol.

Infiniband Host Channel Adapters today allow data rates of up to 20 Gbit/s per RDMA. In addition, Infiniband switches are available which allow an SAN environment to be set up. The high data rates in combination with the lower purchasing costs in comparison with Fiber Channel make Infiniband a worthwhile technology for the design of future SAN environments.

The storage subsystem comprises a multiplicity of hard disks which are assembled using a RAID controller to form a logical drive. In this case, the performance capability of a RAID system is dependent on many factors, only the most fundamental being discussed at this juncture.

Figure 4:
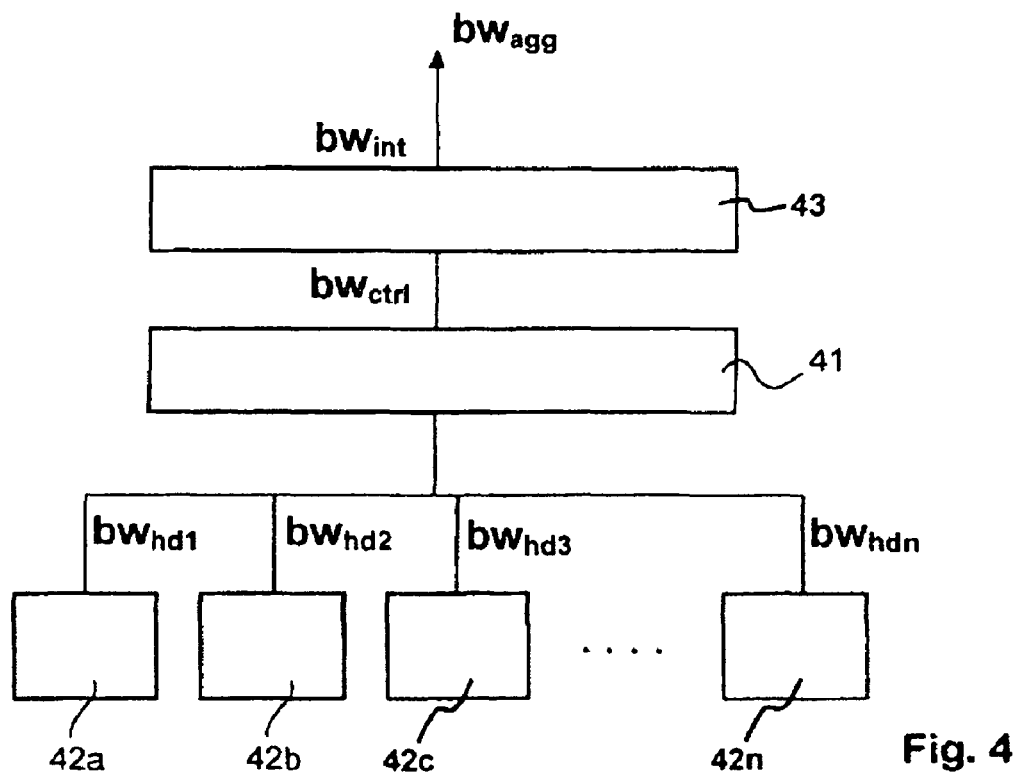

FIG. 4 shows the design of a RAID system comprising a RAID controller 41 and n hard disks 42a, 42b, ..., and also a network interface 43. In practice, a plurality of such systems are frequently integrated in one housing and merged via an SAN.

The total performance ($bw_{agg}$) in respect of the data rate of a RAID system is obtained from the bandwidths of the individual components (respectively identified by $bw_x$ in FIG. 4). Assuming that the data are distributed linearly over all hard disks and no redundancy is being used, theoretically an aggregated bandwidth of $$bw_{aggregate} = \min\left(\sum_{i=1}^{n}(bw_{hdi}), bw_{controller}, bw_{interface}\right)$$

is achieved. Ideally, that is to say that all hard disks are identical in construction and $$bw_{interface} \geq bw_{controller} \geq \sum_{i=1}^{n} bw_{hdi},$$

the equation is simplified to $$bw_{aggregate} = n \cdot bw_{hd}.$$

The aggregated performance of the storage subsystem is obtained, as shown above, from the individual bandwidths of the components used and from the ratio thereof.

The components are evaluated in more detail below and light is shed on the relevant influencing variables.

The data rate of a hard disk is essentially obtained from the physical design, the interface technology and the manner in which the hard disk is accessed. A hard disk comprises one or more round magnetized metal platters which are mounted on a spindle. The metal platters can be used to permanently store information on both sides. In current hard disks, a 512-byte sector represents the smallest storage unit. The sectors are accessed by virtue of rotation of the metal platters at constant angular velocity and the radial movement of the comb on which the read and write heads are fitted. The data areas which are covered for a constant radius of the heads on the platters are called cylinders. To speed up sequential access, the first sector of a cylinder is arranged with an appropriately chosen angular offset from the last sector of the previous cylinder ("Skew"). The constant sector density and rotation of the platters results in the data transfer rates in the outer area of the hard disk being higher than in the inner area.

At present, hard disks are available with SCSI, parallel and serial ATA and "Serial Attached" SCSI (SAS) interfaces. The nominal data rates are 133 MB/s maximum for P-ATA and up to 320 MB/s for SCSI. Serial ATA version 1.0 allows a transfer speed of 150 MB/s, and 300 MB/s in the case of version 2.0. "Serial Attached" SCSI has the same data rate as S-ATA version 2.0.

The transfer rates are greatly influenced by the nature of the access. If the requests are not made sequentially or the data are fragmented on the disk subsystem, the heads need to change to another cylinder. This change is called a "seek". The seek times are dependent on the distance of the current head position from the requested sector and on the speed of rotation of the hard disk. For a hard disk which rotates at 7200 revolutions per minute, seek times can be up to 24 milliseconds and are on average 8.3 milliseconds.

The RAID controller is used by the operating system as an interface to the physical hard disks. The performance is essentially dependent on the RAID level and the cache strategy. In the case of the RAID level, a distinction is drawn between two configurations, in principle, which are optimized in terms of the objective aspects of data integrity and performance. Overall, there is a wealth of RAID configurations and combinations of both aspects, but these are not at the hub of this work, which means that matters are limited to the two essential items of this juncture.

A RAID system which is configured as RAID 0 is designed exclusively for performance. "Striping" is performed over all hard disks, so that all hard disks are used for data. This means that all of the data are present only once on the RAID system and hence there is no data integrity in the event of one disk or a plurality of disks failing. In return, it is possible to use the entire RAID system.

RAID level 10 is designed for data integrity. "Striping" is performed over half of all hard disks, and the other half is used for mirroring the data. This redundancy increases the data integrity, since in the event of one hard disk failing, the data are still present on the mirrored disk. However, mirroring comes at the cost of performance, since each write operation requires that the RAID system be written to twice, and reading involves a check for data consistency.

Depending on its equipment a RAID controller has a buffer which allows it to buffer-store data and to optimize disk access using cache strategies. A distinction is drawn between read and write cache strategies. For writing, the "Write-through" and "Write-back" strategies are usual. A RAID controller with "Write-through" strategy behaves like a controller without a cache towards the operating system, since the completion status is not sent until all data have been written to the hard disk. The "Write-back" strategy sends the completion status right after the data are in the cache. This makes it possible to compensate for runtime delays in the physical hard disks. In the case of long sequential access operations, it is thus possible to write to the hard disk without interruption.

In the case of read access, the strategies "Read-Ahead", "Adaptive-Read-Ahead" and "No-Read-Ahead" are used. In the case of "Read-Ahead", the hard disks are read directly. The "Read-Ahead" strategy reads sectors situated ahead in addition to each request. It it thus possible to cater for sequential requests from the read cache. The "Adaptive-Read-Ahead" mechanism performs a "Read-Ahead" only when at least two successive requests are made. If the sequence is interrupted, no "Read-Ahead" is performed.

The above consideration relating to the performance capability was based on the assumption that the data are evenly distributed over all storage subsystems. However, within a SAN environment, this requires a specific file system that ensures this. This is explained below. First of all, the manner of operation of a cluster file system will be discussed and the difference in comparison with other file systems working on a distributed basis will be explained. Implementations will then be presented, with the main focus being placed on the "StorNext" file system, since this system is frequently used in the environment of professional video processing.

Figure 5:
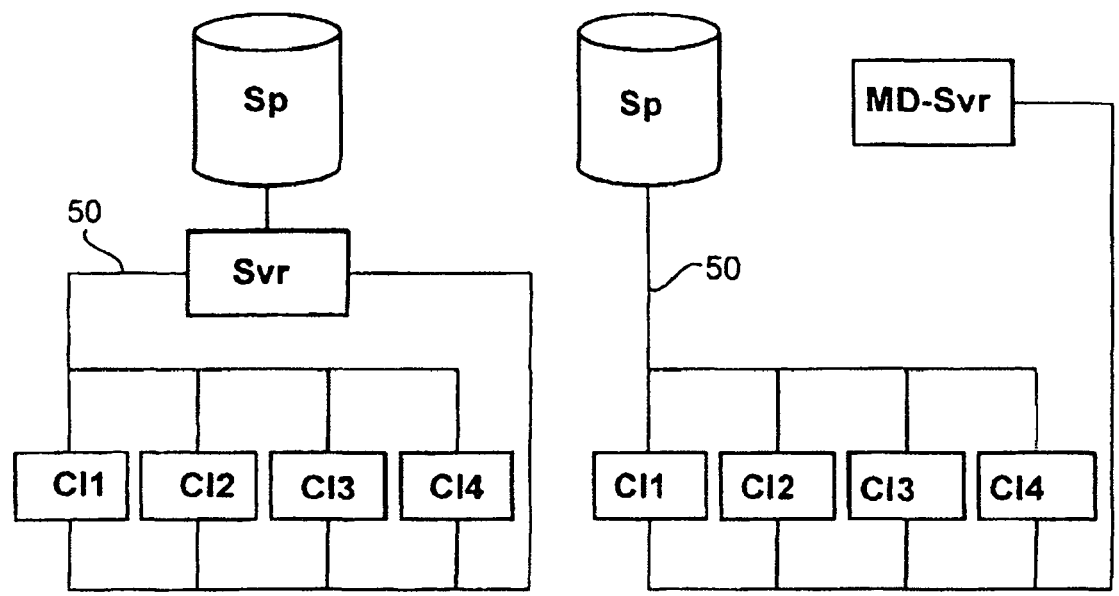

A cluster file system is designed for use in SAN systems. In contrast to network or distributed file systems such as NFS or GFS, a clear division is made between data and management paths. Although a cluster file system also has a central instance, this is used exclusively for managing metainformation and is not used as an interface for the data transfer. FIG. 5 illustrates this circumstance. The path 50 printed in bold is the network used for the payload data.

When accessing or creating a file, the clients first of all send a request to the metadata server. This needs to ensure that multiple clients do not simultaneously access the same file for modification purposes. To accomplish this, the file is possibly blocked and only released again when the request has been processed. The metadata server notifies the clients of the block numbers, associated with the requested files, which the client can then access directly via the storage area network ("Fiber Channel", "Infiniband", etc.). Access is thus effected in block-oriented fashion and not in file-oriented fashion, as in network file systems. The access is more efficient, since the central interface is dispensed with.

The number of available cluster file systems which are suitable for professional use is manageable. These are predominantly for commercial implementations CXFS from SGI and Adic's StorNext.

The StorNext file system is de facto standard in the environment of professional video postproduction. For a block size of 512 Kbytes, it allows file systems of up to 2 PBytes to be addressed. StorNext supports both Windows and Unix clients. Apple clients can be incorporated into the SAN using the XSan file system, which is compatible with StorNext. The file system is configured using a configuration file. A metadata server can manage up to eight instances of StorNext file systems, each instance having a dedicated configuration file. Within the configuration, general file system properties such as block size or maximum number of clients are stipulated. In addition, a plurality of StripeGroups can be defined. Within a StripeGroup, individual block devices are organized and combined. Each RAID group appears as a block device to the operating system, so that a StripeGroup can be used to combine a plurality of RAID systems into a large logical unit. A StorNext file system can manage a plurality of StripeGroups, so that it is possible to make a division between the metadata and the useful data.

FIG. 5 shows arrangements of memory Sp, clients C11-C14 and servers Svr or metadata servers MD-Svr.

Figure 6:
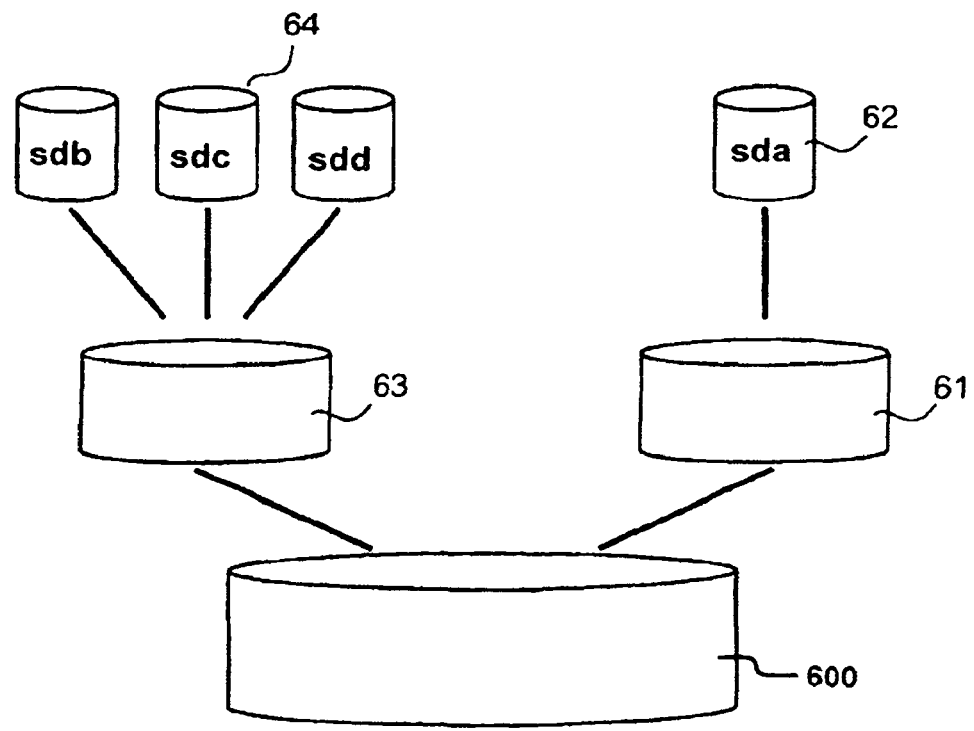

FIG. 6 shows a schematic illustration for a StorNext file system 600. It shows the hierarchy with the aid of an example having a metadata "StripeGroup" 61 with a block device 62 and a data "StripeGroup" 63 with three block devices 64.

The cluster file system CXFS is an extension of the XFS file system from SGI. In contrast to XFS, it does not come under the free GNU public license, but rather is marketed by SGI. Just like StorNext, it allows Windows, Unix and MacOS clients to access the storage subsystem directly using a SAN infrastructure. However, in contrast to StorNext, the CXFS metadata server is available exclusively for IRIX platforms. CXFS is therefore more common in an SGI environment.

INVENTION

The object of the invention is to specify an improved method and an improved apparatus for controlling the access by a plurality of applications, which are respectively implemented as an application client in an operating system environment of a data processing device, to a shared storage system which allow efficient data interchange for the purpose of input/output I/O. In particular, the aim is to optimize the dealings with multimedia data in an operating environment of this kind.

The invention achieves this object by means of a method and an apparatus for controlling the access by a plurality of applications according to independent claims 1 and 10. Advantageous refinements of the invention are the subject matter of dependent subclaims.

The invention comprises the idea of a method for controlling the access by a plurality of applications, which are respectively implemented as an application client in an operating system environment of a data processing device, to a shared storage system which is mapped in the operating system environment in the form of a plurality of storage blocks which are respectively associated with one of the application clients, wherein the method involves:

each storage block being assigned a local I/O access controller which is configured to block or allow access by the associated application client to the storage block, local I/O access controllers which are respectively associated with the same application client being assigned to a local client for flow control which is configured to put the local I/O access controllers which are associated with the same application client into an "access permitted" state or an "access blocked" state together, the operating system environment having a global I/O access controller formed in it which is configured to transmit control information to the local clients for flow control, and an I/O access operation by the application clients to one or more of the storage blocks, which are respectively associated with the application client, in the shared storage system being regulated globally in line with a temporal flow pattern by virtue of the local clients for flow control putting the local I/O access controllers which are associated with the same application client into the "access permitted" state or the "access blocked" state together in line with the control information which is received by the local clients for flow control from the global I/O access controller.

A further aspect of the invention provides an apparatus for controlling the access by a plurality of applications, which are respectively implemented as an application client in an operating system environment of a data processing device, to a shared storage system which is mapped in the operating system environment in the form of a plurality of storage blocks which are respectively associated with one of the application clients, wherein the apparatus has:

local I/O access controllers formed which are respectively associated with a storage block, wherein the local I/O access controllers are configured to block or allow access by the associated application client to the storage block, local clients for flow control formed which respectively have associated local I/O access controllers for the same application client, wherein the local clients for flow control are configured to put the local I/O access controllers which are associated with the same application client into an "access permitted" state or an "access blocked" state together, a global I/O access controller formed in the operating system environment, said global I/O access controller being configured to transmit control information to the local clients for flow control, and an I/O access operation by the application clients to one or more storage blocks, which are respectively associated with the application clients, in the shared storage system regulated globally in line with a temporal flow pattern by virtue of the local clients for flow control putting the local I/O access controllers which are associated with the same application client into the "access permitted" state or the "access blocked" state together in line with the control information which is received by the local clients for flow control from the global I/O access controller.

In the meaning used here, the application client may be a hardware unit, such as a PC client or a more application-based client, for example an application on a data processing unit, for example a personal computer, so that a plurality of application clients can also be implemented on one and the same data processing unit.

The global I/O access controller is used to achieve coordinated access control for the application clients involved which are able to access the shared storage system, by virtue of the local I/O access controllers associated with the respective application client being put jointly either in to the "access permitted" state or into the "access blocked" state. Only if the local I/O access controllers for an application client have been put into the "access permitted" state is the application client able to access associated storage blocks in the shared storage system when required using the local I/O access controllers. In the "access blocked" state, this is denied for all local I/O access controllers which are associated with a shared application client. This particularly prevents any overlaps arising between attempted access operations by different applications to the shared storage system.

In one preferred development of the invention, the control information is used within the context of the temporal flow pattern to assign the local clients for flow control at least one respective temporal access window in which the local I/O access controllers which are associated with the same application client, and which are otherwise in the "access blocked" state, are then put into the "access permitted" state together. The allocation of temporal access windows, which are sometimes also referred to as time slices, ensures that the plurality of application clients are respectively able to effect access for a particular length of time. In this context, provision may be made for the application clients all to be successively assigned a temporal access window. This stipulates an order for access. When assigning the temporal access windows, it is possible to take account of priorities which are known to the global I/O access controller. By way of example, individual application clients can be given preferential treatment in comparison with others. Such preference can be documented firstly by an access opportunity which is earlier in the order. Alternatively, preference may involve one application client being assigned a longer temporal access window in comparison with other application clients. In general, the application clients need to be configured to buffer access requests until the temporal access window allows them to execute such access requests.

In one expedient refinement of the invention, provision may be made for the control information to be used within the context of the temporal flow pattern to assign the local clients for flow control respective temporal access windows of the same length. Alternatively, provision may be made for the local clients for the flow control and hence the associated application clients to be assigned temporal access windows of different length, for example in order to allow priorities to be taken into account. This makes it possible to implement any variety of time length for the access windows.

In one advantageous embodiment of the invention, the control information is used within the context of the temporal flow pattern to assign the local clients for flow control temporal access windows in line with a respective requested proportion of a total access bandwidth. The total access bandwidth is determined on the basis of the implemented system prerequisites in the operating environment of the data processing device. An application client can claim its requested proportion of the total access bandwidth as a relative variable (percentage) or using a specific bandwidth specification.

Preferably, in one development of the invention, the control information is used within the context of the temporal flow pattern to assign the local clients for flow control temporal access windows in line with service quality requests previously negotiated between the application clients. By way of example, a service quality request may be a data rate required by the application client, for example. Said data rate can be regulated over the length of the assigned timeslice, so that application clients which have a higher demand for data rates are assigned a longer access window.

In one advantageous refinement of the invention, provision may be made for the temporal access window respectively associated with the local clients for flow control to be terminated if inactivity in the associated application clients is detected. The inactivity can be detected by a local instance of the I/O access controller. In this case, provision may be made, by way of example, for termination to come after a predetermined time of inactivity. This period prior to termination may be chosen to be the same for all application clients or the associated local clients for the flow control. Provision may also be made for different periods prior to termination to be stipulated, however. In addition, it is possible to detect inactivity on the part of the global I/O access controller on the basis of the I/O requests from the application client. In this case, before the start of a new scheduling pass, only the I/O requests received from the application clients during the last pass are taken into account for the subsequent scheduling scheme.

In one development of the invention, provision may be made for the local I/O access controllers to be respectively formed as a module which can be loaded at runtime.

In one preferred development of the invention, each local client for flow control is assigned local I/O access controllers which are associated not only with the same application client but also with storage blocks in a single file system. A file system can combine a plurality of physical storage blocks into a logical storage unit, so that only one logical storage unit is visible to application clients. This means that it is possible to aggregate the magnitude and the performance of a plurality of storage blocks and to use them for application clients.

In one expedient refinement of the invention, provision may be made for the operating system environment to have a further global I/O access controller formed in it which operates in line with the manner of operation of the global I/O access controller and globally regulates the access to a further shared storage system which is optionally implemented in the data processing device in line with the shared storage system. The further global I/O access controller can be produced, in terms of its design and in terms of its manner of operation, in line with the principles of the global I/O access controller in conjunction with the other elements of the data processing device. Optionally, however, individual configuration features may also have differences. Similarly, it is possible for the further shared storage system to be implemented in line with the shared storage system only in respect of individual configuration features.

DRAWING

Figure 7:
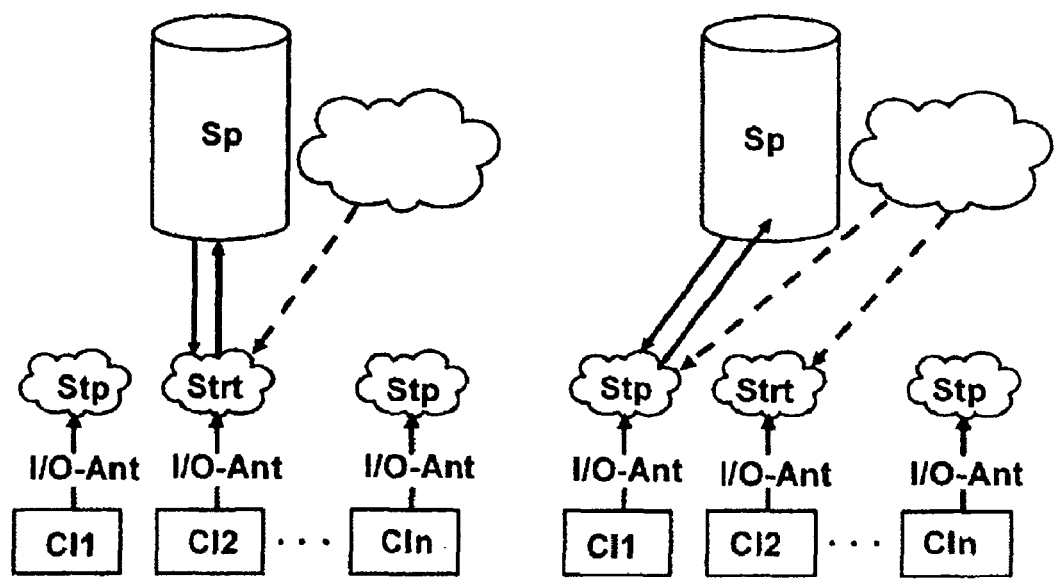
Figure 8:
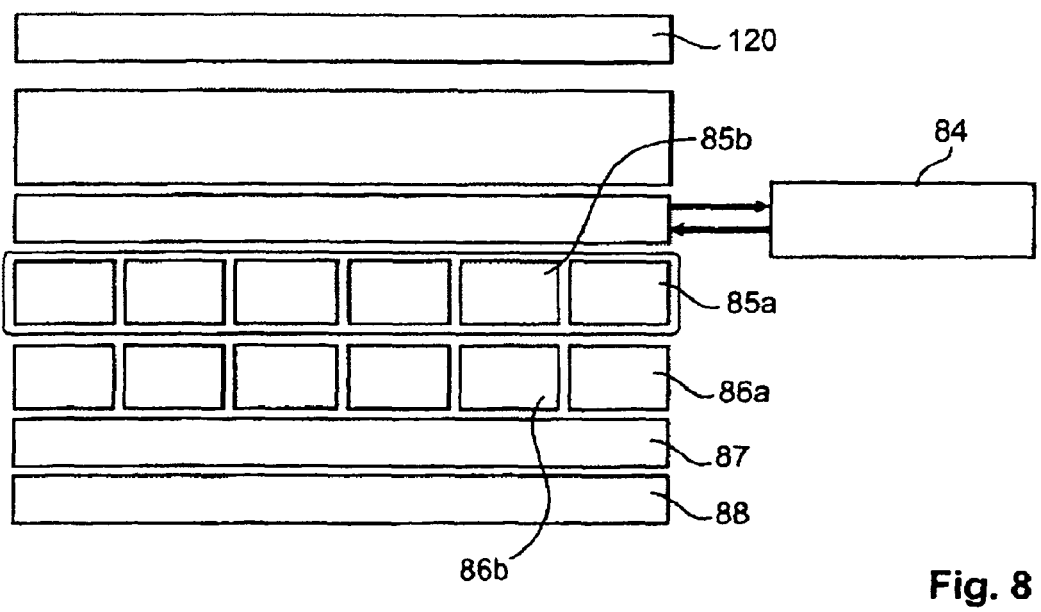
Figure 9:
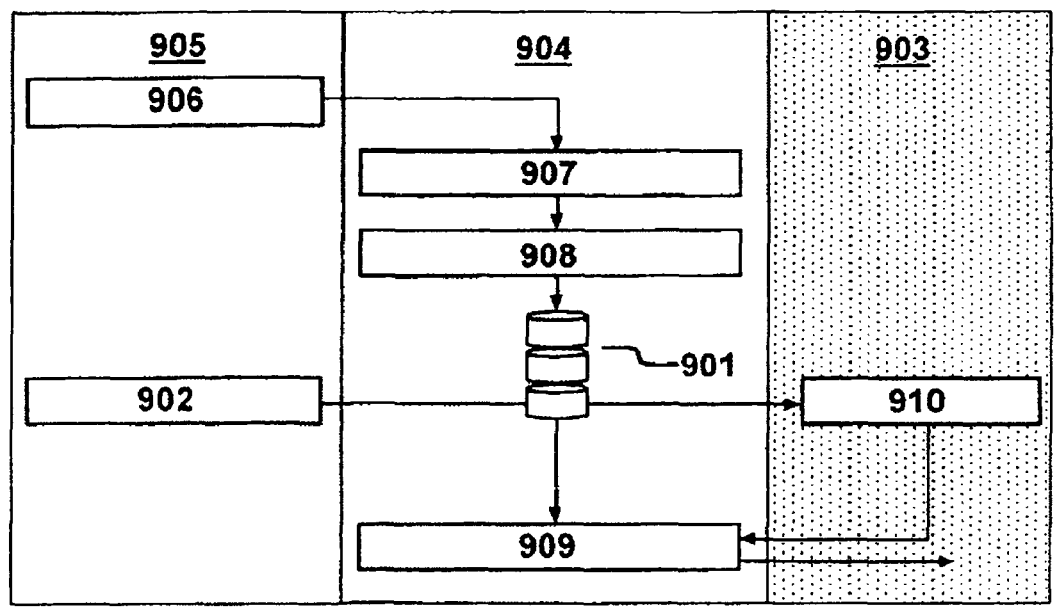
Figure 10:
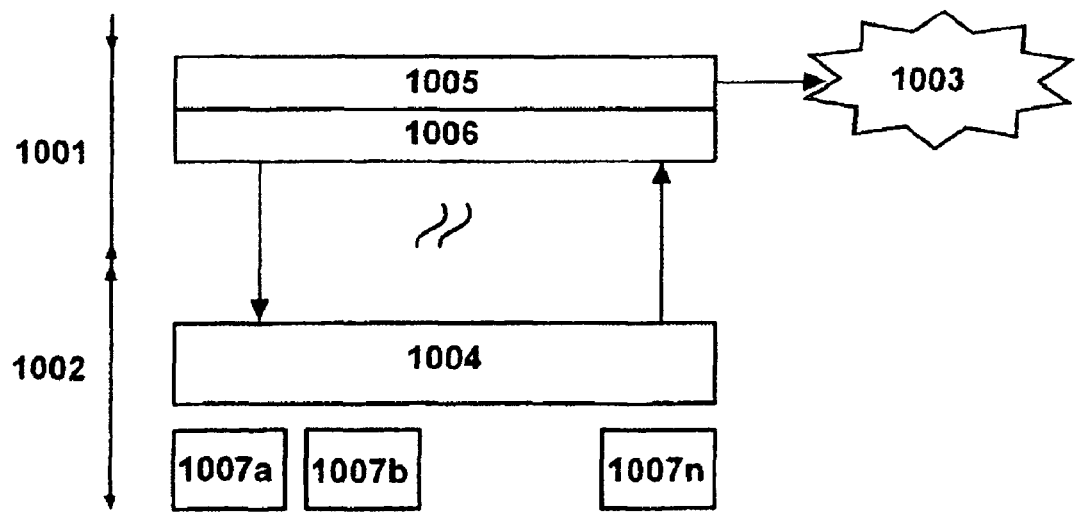
Figure 11:
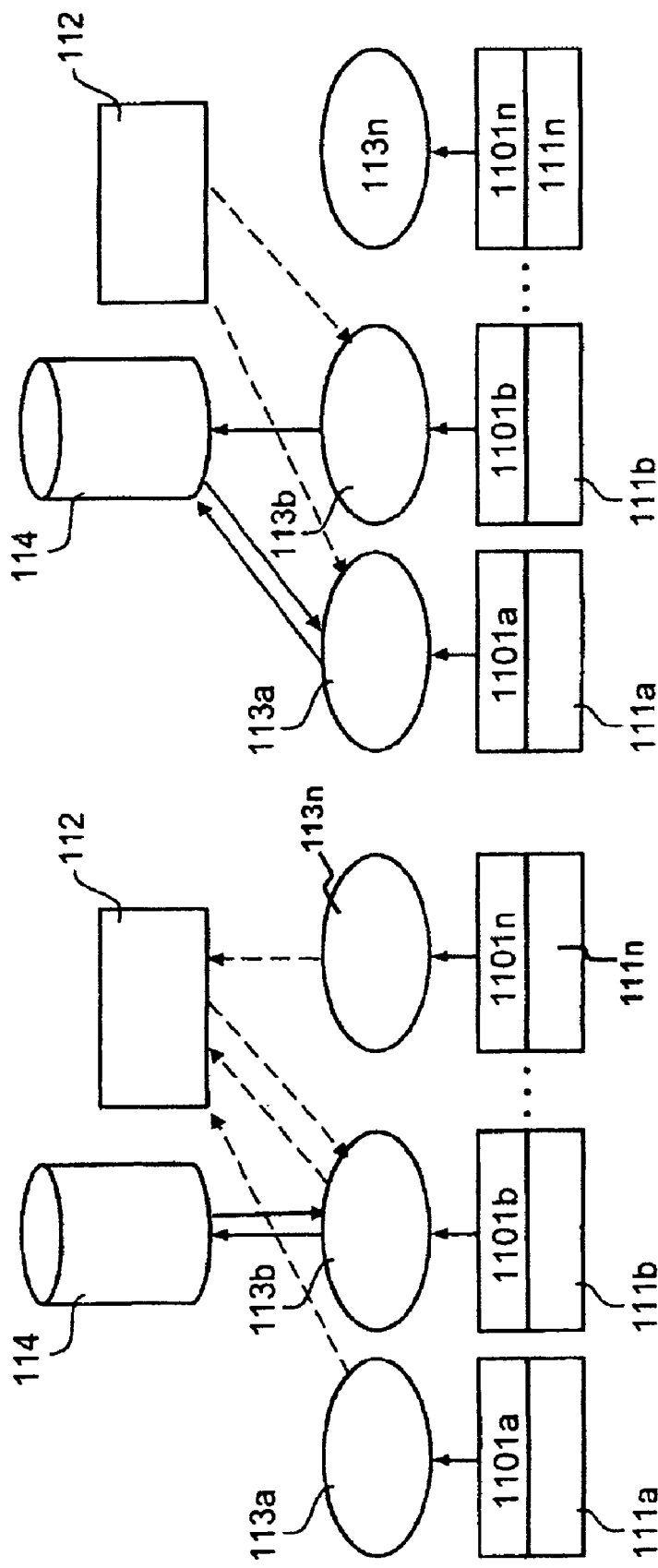
Figure 12:
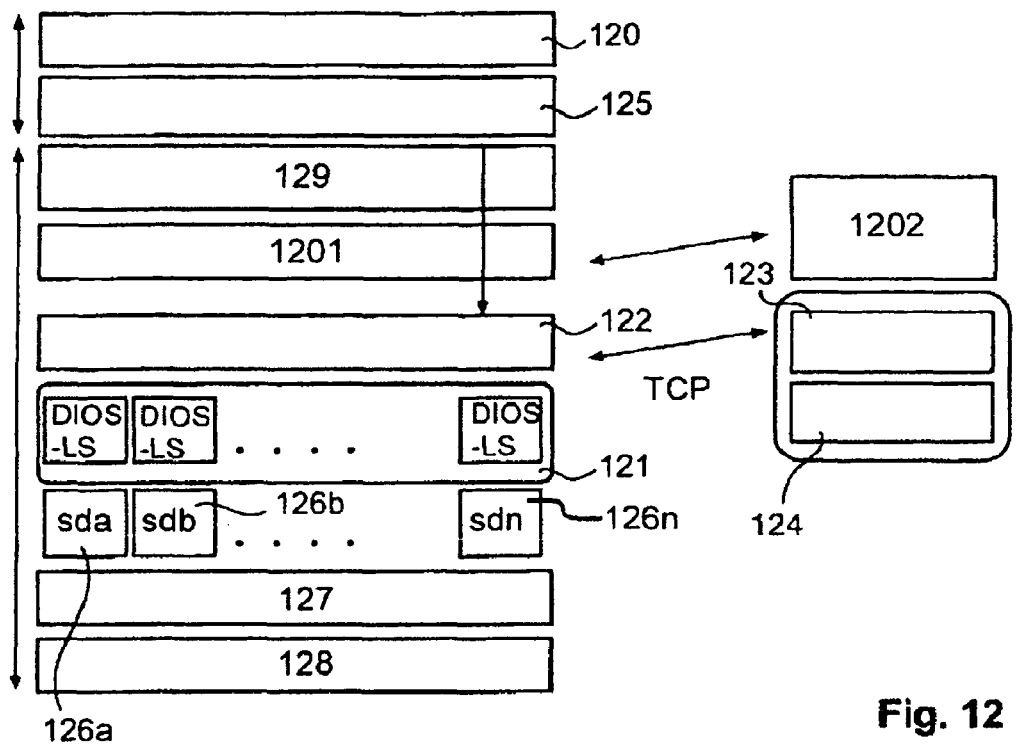
Figure 13:
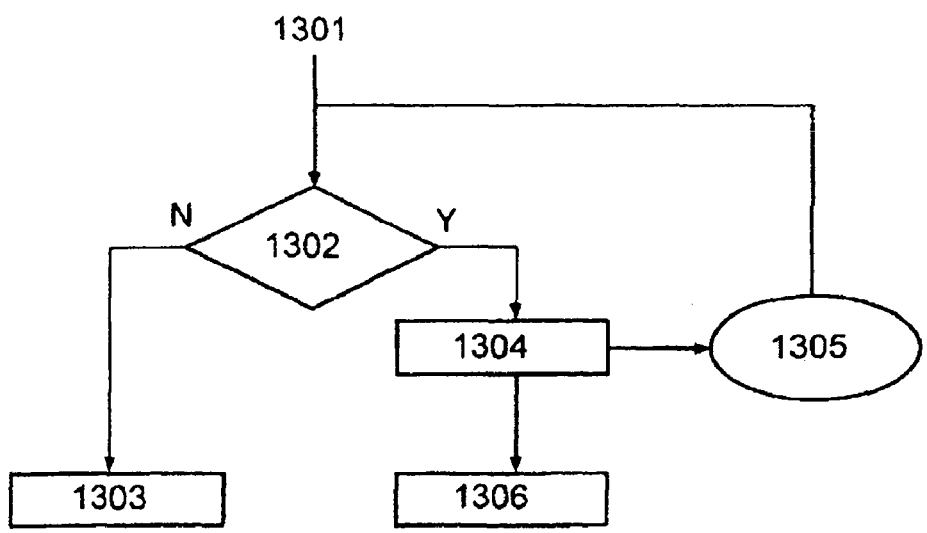
Figure 14:
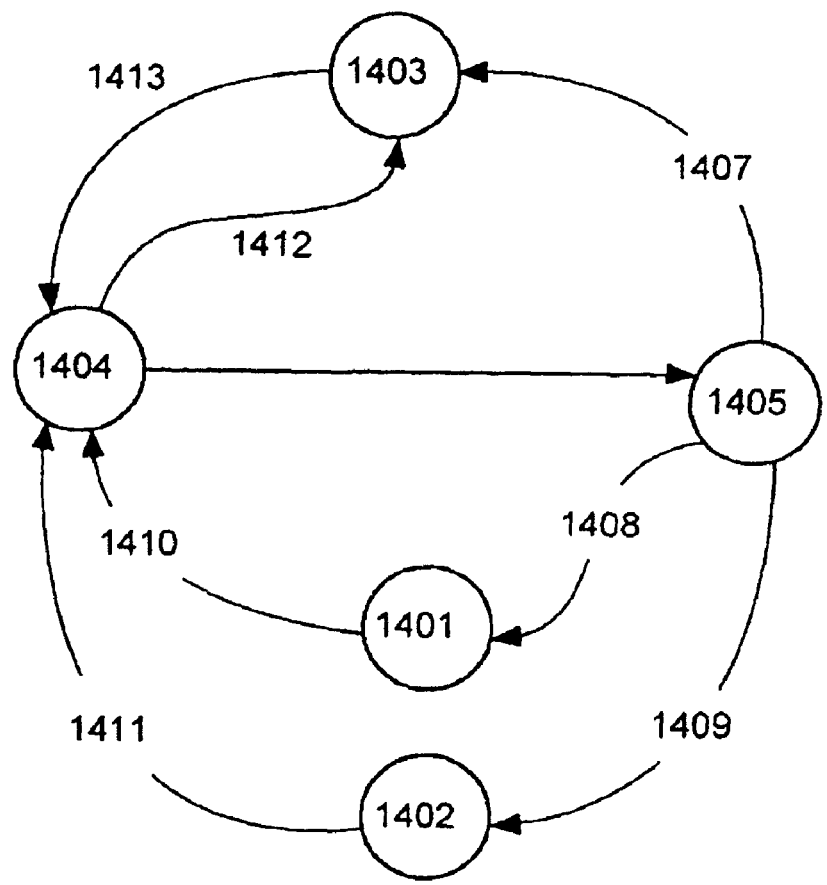
Figure 15:
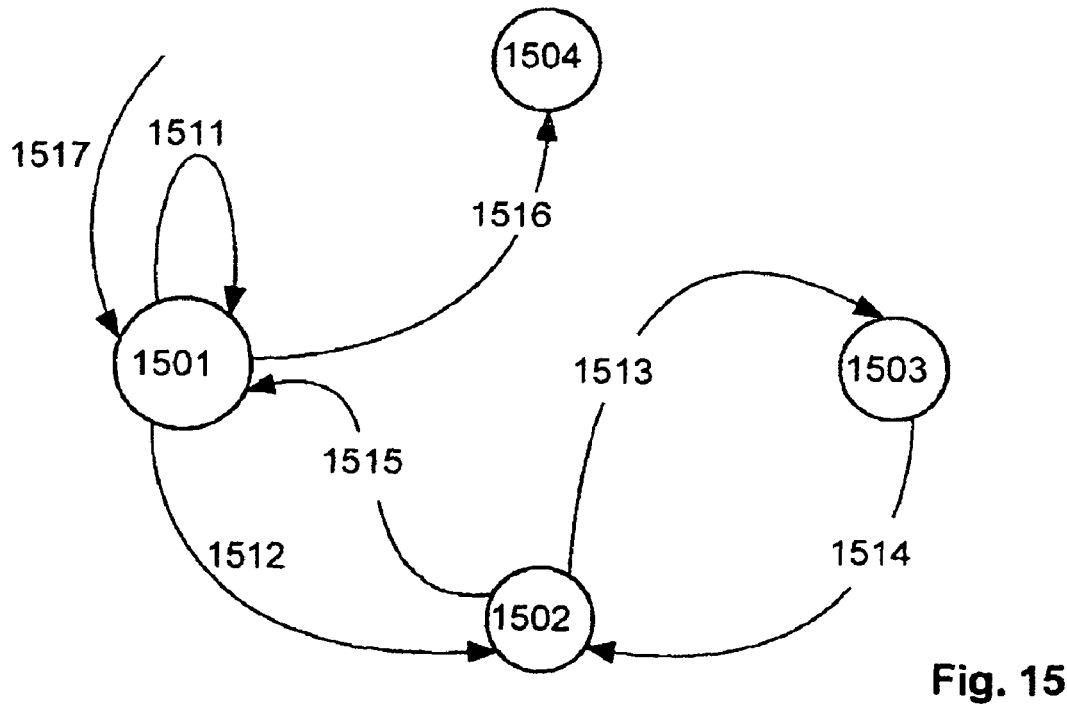
Figure 16:
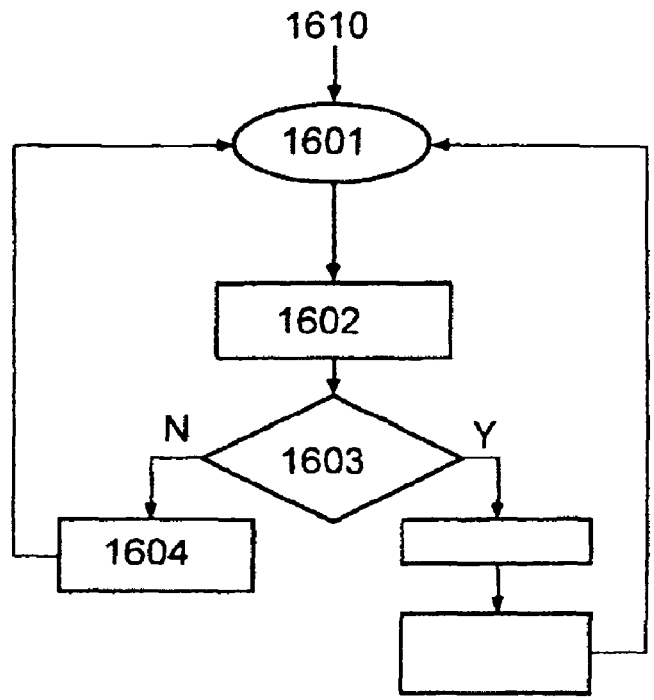
Figure 17:
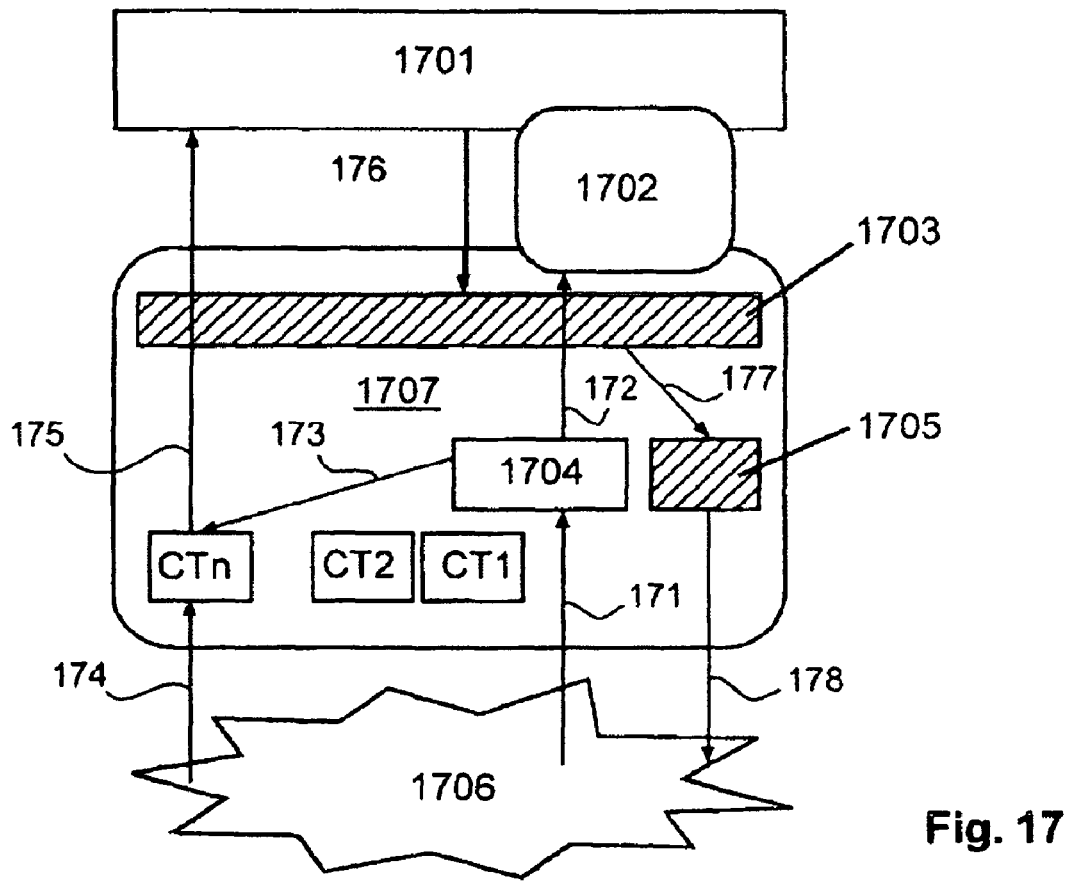
Figure 18:
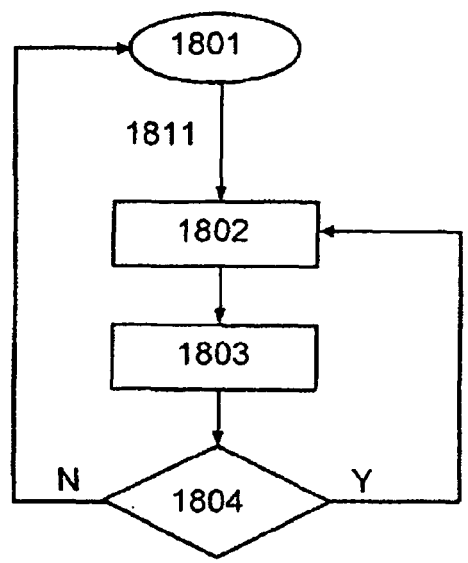
Figure 19:
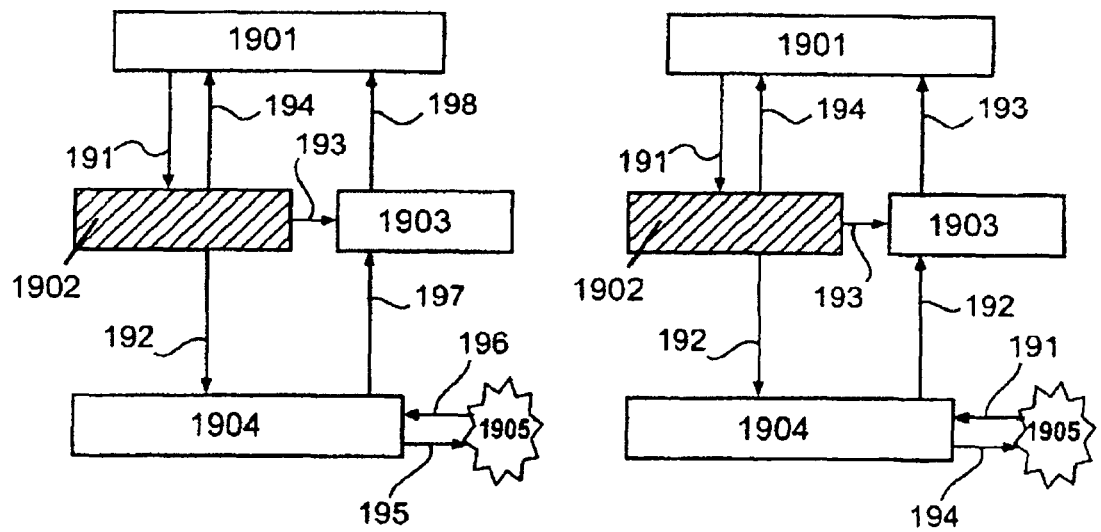
Figure 20:
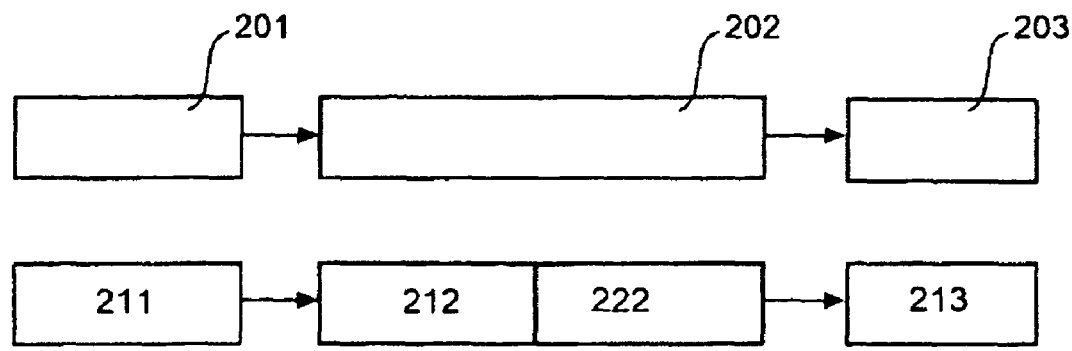
Figure 21:
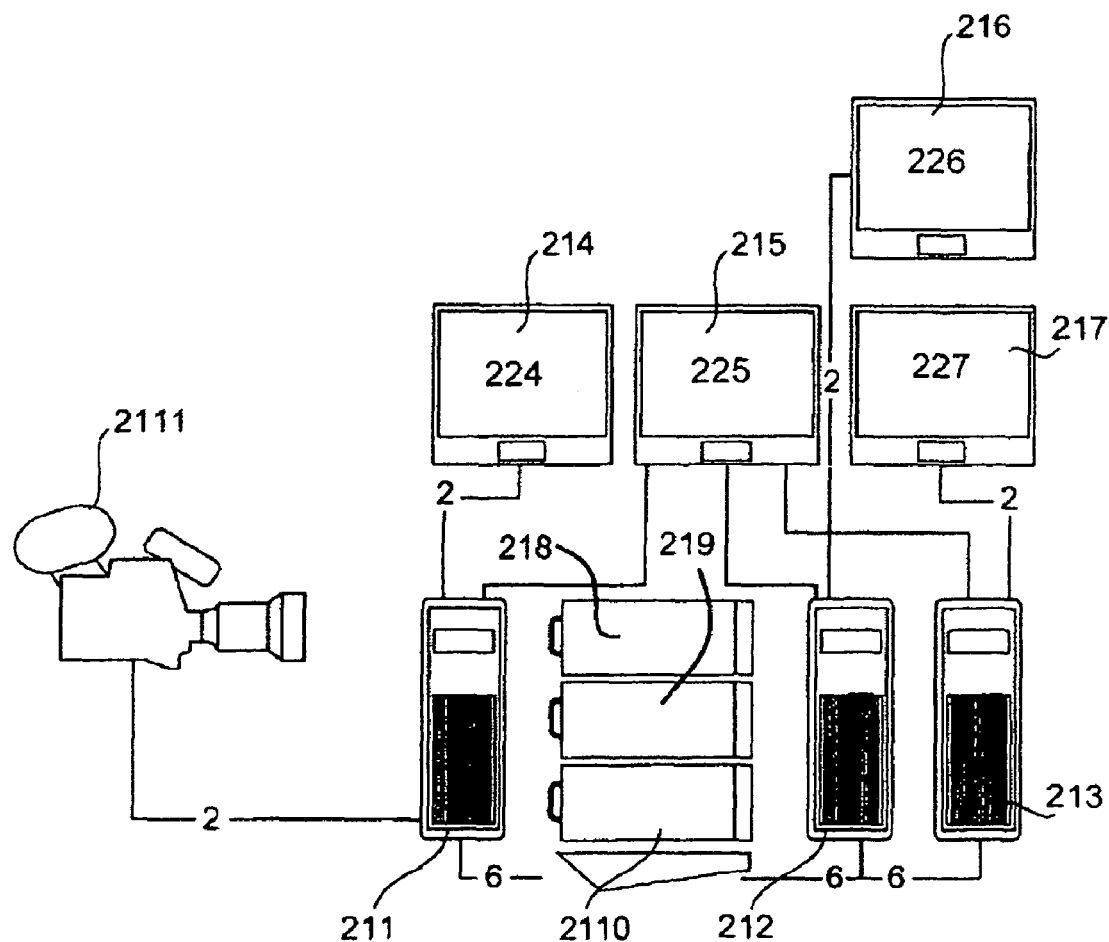

The invention is explained in more detail below using exemplary embodiments with reference to figures of a drawing, in which:

FIG. 1 shows a schematic illustration of a known infrastructure for processing multimedia data, particularly film data, following production, FIG. 2 shows a schematic illustration of an abstract design of a known data processing device with a plurality of application clients and a shared storage system, FIG. 3 shows a schematic illustration for comparing a known "Attached Storage" system and a known SAN system, FIG. 4 shows a schematic illustration of a known RAID system, FIG. 5 shows a schematic illustration for comparing the manner of operation of a known network file system (left) and a known cluster file system (right), FIG. 6 shows a schematic illustration for a known StorNext file system, FIG. 7 shows a schematic illustration for describing the functionality of a method and an apparatus for controlling the access by a plurality of applications, FIG. 8 shows a schematic illustration of a layer model of an application client in a SAN environment, FIG. 9 shows a schematic illustration of embedding of an I/O scheduler in a Linux operating system kernel, FIG. 10 shows a schematic illustration of a network interface for a user space with kernel user space communication, FIG. 11 shows a schematic illustration of the design of an apparatus for controlling the access by a plurality of applications ("Scheduling Framework") at two different times, FIG. 12 shows a schematic illustration of a DIOS framework, FIG. 13 shows a flowchart for a delay mechanism in a local DIOS scheduler, FIG. 14 shows a schematic illustration of a state machine in a local DIOS scheduler, FIG. 15 shows a schematic illustration of a state machine in a DIOS client, FIG. 16 shows a flow chart of a DIOS server thread, FIG. 17 shows a schematic illustration of an architecture of a DIOS server kernel module, FIG. 18 shows a flowchart of a global I/O scheduler (global I/O access controller), FIG. 19 shows a schematic illustration to explain a manner of operation of a DIOS-QoS-API, FIG. 20 shows a block diagram for a work flow, and FIG. 21 shows an illustration of a test design for the work flow in FIG. 20.

The coordination of I/O access operations by a plurality of application clients within a storage area network firstly requires knowledge of all I/O access operations by the clients and secondly requires an opportunity, during competing access, to delay I/O requests from all clients—apart from one.

FIG. 7 shows a schematic illustration of a layer model of an application client in an SAN environment. An I/O path is respectively shown by means of a solid arrow, and a network path shown by means of a dashed arrow.

The parts of FIG. 7 which are shown as a cloud 71 are evaluated below. Particularly the question regarding how and above all where the delay is occurring is of importance for the design. Basic demands on the system are described independently of application, independently of file system, in a high-performance and modular and extendable fashion. In addition, global scheduling of I/O requests requires a suitable communication medium and model. Store Sp, Stop Stp, I/O-Ant and start Strt are shown.

The requirements cited at the outset already imply that the delay mechanism can be integrated within a Linux operating system, for example, since all I/O requests to the cluster file system need to be intercepted and possibly delayed.

FIG. 8 shows a schematic illustration of a layer model of an application client in the form of PC client in a SAN environment.

Each application 81 which accesses a file system does so using a virtual file system (VFS 82). In this layer, the POSIX calls are mapped onto the underlying file system 83. Since all I/O requests are made using the virtual file system, the opportunity arises to start at this point. This entails a few problems, however: latencies, distinction between I/O requests required and intervention in build-in part of the kernel.

If the I/O access operations are already being blocked in the VFS, the requests first need to be requested from the metadata server by the file system client before the actual data transfer takes place. This results in a relatively high level of latency, which can lead to problems for the coordination. In addition, it would be necessary to filter out from all I/O requests those which access the cluster file system. The third point relates firstly to the update time in development and secondly to manageability. As soon as changes are made in the build-in part of the Linux kernel, the complete kernel needs to be compiled, which means that the development becomes much more complex. Furthermore, this is inconsistent with the demand on the modularity of the system.

A cluster file system basically provides the optimum prerequisites for distributed scheduling, since firstly all the relevant I/O requests accumulate in this layer and secondly an infrastructure is already present in the form of a client/server framework. On account of the fact that the only relevant cluster file systems in the application background (StorNext, CXFS) are not open source, extension of a cluster file system is ruled out. Furthermore, on the basis of the requirements, a file-system-independent solution will be preferred.

The I/O scheduler 85a, 85b . . . is used for optimizing the block device access. The I/O requests are collected and sorted before being forwarded to the block device driver 87. Four algorithms are available for the collection and re-sorting. From Linux kernel version 2.6.10 upwards, it is possible to stipulate the heuristics at runtime dynamically for each block device 86a, 86b, . . . . If a scheduler is assigned to a plurality of block devices then there are also a plurality of instances of the scheduler which share a storage area. The I/O scheduler is embedded in the "Elevator" in the form of a kernel module and solely represents the scheduling algorithm.

FIG. 9 shows a schematic illustration of embedding of an I/O scheduler 404 in a Linux operating system kernel. A page cache/VFS 905 contains the functions _make_request(*q) 906 and _generic_unplug(*q) 902.

The functions elevator_merge_req_fn(*q) 907, elevator_add_req_fn(*q) 908 and elevator_next_req(*q) 909, which are preceded in the I/O scheduler by an "elevator", are generic functions within the elevator. The elevator converts the functions to the implementation of the chosen I/O scheduler. The illustration in FIG. 9 leads one to suppose that the "request" queue is held within the I/O scheduler, but this is not the case.

All functions which perform the flow control within the kernel module have the data required for this purpose transferred to them within a structure. The data management can therefore be regarded as object-oriented. Thus, any instance can use individual data without memory conflicts arising on account of the shared storage area.

In addition, FIG. 9 shows the flow of an I/O access operation. When the request has been inserted into the request queue 901, the kernel calls the function 902 _generic_unplug under time control, and said function triggers the driver 903 if a request is available. The driver then requests a request, the request_fn(*q) function 910. The I/O scheduler 904 is therefore just an interface and has only restricted ability to take the initiative. This case is considered in more detail in the course of the next section, where the four available schedulers are presented.

The No-Operation I/O scheduler is the simplest implementation. As the name already states, no I/O requests are re-sorted, but rather they are passed immediately to the device driver 903. In the case of random block device access operations from various applications, the use of the NOOP scheduler results in a large quantity of seeks on the block device and hence in low performance. For sequential block access operations from a single application, as assumed in this work on account of the properties of the applications, the NOOP scheduler achieves the best performance with the lowest possible latency, since the I/O requests are forwarded immediately to the device driver.

The deadline scheduler is a further development of the NOOP scheduler. Instead of forwarding the requests directly, they are collected and sorted according to sector size. This involves separate lists being managed for read and write access operations. It is thus possible to reduce seeks. A time limit prevents requests from processes which will result in a wide seek on the hard disk from "starving" (J. Quade et al., "Kerntechnik Folge 19", Linux Magazin, vol. 03, pp. 88-92, 2005; R. Love, Linux Kernel Development, Novell Press, 2005).

The anticipatory I/O scheduler operates on the basis of the same approach as the deadline I/O scheduler. However, a more sophisticated heuristic is taken as a basis. The scheduler carries a statistic about the I/O requests from individual processes and attempts to use it to anticipate the next access operations. Possibly up to six milliseconds are waited to see whether the predicted request arrives. Upon the arrival of a request for sectors which is situated in direct proximity to the current position, said request is passed through directly. For the heuristic, both the intervals of time between the I/O requests and the average distance of the sector numbers are taken as a basis (J. Quade et al., "Kerntechnik Folge 19", Linux Magazin, Vol. 03, pp. 88-92, 2005; R. Love, Linux Kernel Development, Novell Press, 2005).

The Completely Fair Queueing algorithm attempts to handle every I/O process in the same way. To this end, for each process, a read and write list is managed and the orders are sorted. The scheduler takes a number of requests from each list on the basis of the round robin method, sorts them and forwards them to the device driver. The aim is to accord each process the same proportion of the bandwidth made available by the block device (J. Quade et al., "Kerntechnik Folge 19", Linux Magazin, vol. 03, pp. 88-92, 2005; R. Love, Linux Kernel Development, Novell Press, 2005).

The Linux IO scheduler meets all the requirements for integration of a delay mechanism. The fact that it can be changed at runtime and that all relevant I/O requests can be intercepted at this point contribute to this decision. In view of the application background, the No-Operation scheduler is a good basis for the implementation of the delay mechanism.

A further important design decision arises from the need for network communication between the clients involved. In this connection, the aim is to clarify where and how the network interface is implemented. In principle, two areas are available in the operating system—user space and kernel space—the pros and cons of which are compared briefly below.

Implementation of the network interface in the user space requires an additional kernel/user space interface, since the I/O scheduler is located in the kernel. There are three options available for the communication between the kernel and a user space application in a Linux operating system—IOCTL, Systemcalls and Netlink Sockets.

The first two options are ruled out, since they only allow a user space application to call parts of the kernel initiatively and the kernel does not have the opportunity to initiate communication. For this reason, only the use of Netlink Sockets is suitable.

FIG. 10 shows a schematic illustration of a network interface for a user space 1001 and a kernel 1002 with kernel/user space communication.

The user space application communicates with the other clients via a network 1003 and forwards the information to a netlink server 1004 within the kernel. For this purpose, a network client 1005 and a netlink client 1006 are shown in the user space 1001. The advantages are the simple implementation of the network interface in the user space and the standardized POSIX-API which is available for network functions. In addition, it is possible to resort to frameworks such as the ACE library in the user space. The indirect route via the user space, and the use of a framework, results in additional overhead, however (J. Corbet et al., *Linux Device Drivers*, O'Reilly, Third Edition 2005). A plurality of I/O schedulers 1007a, 1007b, 1007n are shown in the kernel.

As an alternative to the user space implementation, the implementation can take place directly in the kernel. Instead of communicating with a user space application via a netlink server 1004, communication is with another client directly via a socket. The overhead which arises as a result of the indirect route via the user space could therefore be saved. However, good knowledge of kernel programming is required in order to implement it. Besides the performance gain, the current kernel development is also an advocate of implementation in the kernel space, it can be foreseen from the fact that for the kernel 2.6.19 onwards a new kernel API is available which simplifies the network programming in the kernel.

In the exemplary embodiment, the kernel-internal solution is regarded as the more suitable variant. The complexity for implementing a netlink socket server is comparable with that of a kernel-internal network interface.

In the area of flow control ("scheduling") for realtime applications, a distinction is basically drawn between two approaches, namely dynamic scheduling and static scheduling, which are respectively differentiated further by "pre-emptive" and "non pre-emptive". Besides the properties of the scheduling, there are also two topologies for the scheduling available for selection: central scheduling and distributed scheduling.

These aspects are considered in more detail below.

A scheduler is denoted as dynamic if it makes the scheduling decision at runtime. This involves taking account of the current requirements of the system and reacting dynamically to any changes. Dynamic schedules are therefore also called "online schedulers".

A static scheduler operates on the basis of one of the previously stipulated deterministic schemes. Changes to the requirements cannot be taken into account at runtime. These schedulers are therefore also called "pre-runtime schedulers". A scheduler which operates "pre-emptively" is able to interrupt a current process in order to give preference to a higher-priority process. This method affords a relatively high level of flexibility, but the management complexity increases considerably, since additional mechanisms need to ensure that a low-priority process does not "starve". In the case of "non pre-emptive scheduling", a current process cannot be interrupted. The scheduler needs to wait for the execution and can only then react to a higher-priority request.

If the scheduling is performed by a central station, this is referred to as central scheduling. In this case, the system contains an instance in which all information converges and the scheduling decisions are made. This instance is the critical point ("single point of failure") of the system. The system operates on the basis of the client/server principle.

In the case of distributed scheduling, each of the clients involved has knowledge of all other clients. The clients negotiate the scheduling decisions with one another. This type of scheduling is more robust than central scheduling, but at the cost of efficiency. During the negotiation phase (arbitration), it is not possible for any I/O access operations to take place, for example, and performance is lost.

The chosen application background describes a straightforward scenario. The scheduling system is intended to coordinate a small number of active clients which access the storage system sequentially. Static scheduling is therefore appropriate in a first step, since it is more efficient with respect to overhead. For this reason, an interruptible scheduling is also preferable. Furthermore, central scheduling is appropriate in the exemplary embodiment, since it first corresponds to the manner of operation of a cluster file system and secondly the system has to serve a manageable number of clients and hence the client/server principle is more efficient.

On the basis of the prior considerations, the concept of the overall scheduling framework is presented below for the chosen exemplary embodiment.

FIG. 11 shows a schematic illustration of the design of an apparatus for controlling the access by a plurality of applications ("Scheduling Framework") at two different times. An I/O path is shown by solid arrows, and a network path is shown by dashed arrows.

Individual clients 111a, 111b, . . . communicate with a superordinate scheduler 112 and register I/O requests 1101a, 1101b, . . . . A local I/O scheduler 113a, 113b, . . . blocks the accumulated I/O requests 1101a, 1101b, . . . . The superordinate scheduler 112 assigns the individual clients 111a, 111b, . . . , in order, timeslices (time windows) in which a storage system 114 may be accessed.

The granularity of the scheduling influences the performance of the system. The larger the timeslices, the longer are the individual clients able to operate sequentially. However, long scheduling intervals worsen the response times of the system, and large application buffers are needed. Scheduling interval means the time which is taken as the basis of the timeslice calculation. That is to say the time which is split over all clients. The dimensioning of this parameter is thus highly dependent on the requirements of the respective application. It therefore makes sense to make the length of the total scheduling interval configurable for the user of the framework.

To compensate for deficits in known storage area networks, a distributed-operation I/O scheduling system has been developed. The next few sections will first of all explain the structure of the framework and the general functions and also interfaces of the individual components. The manner of operation of the individual modules will then be illustrated in detail.

FIG. 12 shows a schematic illustration of a "Distributed I/O Scheduling" (DIOS) framework. It shows, inter alia, a virtual file system 129 (VFS), a file system client 1201 and a metadata server 1202.

The DIOS framework has five components which are included by an application client 120. The main part is formed by four kernel modules: a DIOS local scheduler (DIOS-LS) 121, a DIOS client 122, a DIOS server 123 and a DIOS global scheduler (DIOS-GS) 124, which are able to be loaded dynamically at runtime. In addition, the system provides a user space library (DIOS-QoS API) 125 which acts as an optional interface for applications. A shared storage system is depicted by means of a plurality of storage blocks 126a, 126b, . . . . The block device driver 127 checks incoming data on the I/O subsystem 121, 126 and forwards said data to the actual hardware component 128. Said component may comprise a fiber channel host bus adapter, for example.

The system is of modular design and operates independently of application. Only the optional use of the QoS library (DIOS-QoS API 125) requires action to be taken in the application. The module dependencies are limited to DIOS client 122→DIOS local scheduler 121, DIOS-QoS API 125→DIOS client 122 and DIOS global scheduler 124→DIOS server 123 and are intercepted by the operating system in the event of error.

In the exemplary embodiment, the DIOS-LS 121 replaces the local I/O scheduler of a Linux operating system. For each connected storage subsystem, there is an instance of the module. Said module is used for blocking and processing I/O requests for a defined time period. The underlying heuristic for processing the requests corresponds to that of the NOOP scheduler.

replaced without altering the underlying system. This is even possible dynamically in the course of operation.

The DIOS-LS module 121 exports functions which are called by the DIOS client 122 in order to forward commands to the instances of the local I/O scheduler. During initialization, the DIOS client 122 transfers a callback reference to the DIOS-LS modules, said callback reference being used to implement the communication between the DIOS-LS 121 and the DIOS client 122.

The communication between the DIOS server 123 and the DIOS client 122 is effected using a TCP/IP-based protocol. The protocol is implemented in the DIOS server 123 and in the DIOS client 122, so that the global scheduler (DIOS-GS 124) has no knowledge of this protocol.

The interfaces between the DIOS server 123 and the distributed-operational I/O scheduler 121 likewise comprise asynchronous kernel functions and a callback mechanism. The user space library 125 and the DIOS client 122 communicate via a Netlink socket. The user space library 125 provides an application with an interface in the form of export functions. For each API function, there is a respective synchronous and asynchronous variant available for selection.

Besides these interfaces, the framework provides a user interface by means of the Sys file system. This can be used by the user in the course of operation to change parameters of the system. All values which are subsequently referred to as freely selectable or definable can be configured using this interface. In addition, the Sys file system interface provides status information. The concept and design of the individual modules is illustrated in the subsequent sections.

The communication protocol is message-based and based on the TCP/IP protocol. The data link layer of the TCP/IP protocol performs the task of flow control, so that the proprietary protocol is used solely for the interchange of information between the server and the individual clients.

TABLE 1

Overview of the available message types, and containing information (marked by x) from the communication protocol

| Type | Mode | Timeslice (time window) | "applied" bandwidth | "available" bandwidth | "physical" bandwidth |
|---|---|---|---|---|---|
| CONFIG | — | — | — | — | X |
| CONN CLOSE | — | — | — | — | — |
| ACK | — | — | — | — | — |
| 44 cmCMD | "best effort" | X | — | — | — |
|  | "realtime" | X | X | — | — |
|  | "noop" | — | — | — | — |
|  | "break" | — | — | — | — |
| APPLY_REQ | — | — | — | — | — |
| APPLY_BW | — | — | X | — | — |
| ACK_APPLIED_BW | — | — | X | X | — |
| RELEASE_BW | — | — | — | — | — |

The DIOS client 122 and the DIOS sever 123 serve as a communication interface between the individual application clients and the superordinate global I/O scheduler (DIOS-GS 124). In addition, the DIOS client 122 serves as a central station for a client which synchronizes all instances of the local I/O scheduler 121. The DIOS server 123 exclusively undertakes the transmission of the messages to the clients. The global DIOS scheduler 124 is responsible for the actual flow control. This division serves the purpose of modularity and therefore allows the scheduling algorithm to be easily The individual message types are shown in table 1. Apart from the CONN_CLOSE and RELEASE_BW messages, all messages are used unidirectionally. The release of reserved bandwidth (RELEASE_BW) and the closure of the connection (CONN_CLOSE) can be initiated either by the DIOS client 122 or by the DIOS server 123. The CONFIG message is used for registering the DIOS client 122 with the DIOS server 123 and notifies the latter of what physical bandwidth the system has available. ACK messages are sent by the DIOS client 122 when the time window ("timeslice") assigned by means of the CMD message has elapsed and the data transfer has been stopped. The DIOS client 122 sends an APPLY_REQ message as soon as an I/O request is in one of the queues of the local I/O scheduler 121 and has been delayed. The distributed scheduler responds with an ACK APPLIED BW message to a bandwidth reservation (APPLY_BW). The response packet contains both the reserved and the still available bandwidth of the storage system.

The local I/O scheduler (DIOS-LS) 121 is based on the NOOP scheduler, since in the exemplary embodiment the NOOP scheduler has proved itself to be the most suitable of the four I/O schedulers available in the Linux kernel in the use environment of storage area networks. The function of the DIOS-LS 121 within the DIOS framework is to block I/O requests until the superordinate I/O scheduler 124 grants permission. The DIOS-LS 121 therefore initially distinguishes between two elemental states: blocking and non-blocking, which are regulated by means of a global flag. These two states are divided into further substates and modes of operation, which are explained in the sections below. Particularly the implementation of the blocking state has proved difficult and requires closer consideration in order to understand the design further.

The following section shows the manner of operation of the blocking state. Subsequently, the two subordinate states of the blocking state are explained in more detail.

The properties of the Linux I/O scheduler which are demonstrated above, in combination with the fact that several instances of the scheduler exist, complicate the implementation of the blocking mechanism in the chosen exemplary embodiment. In this case, it is not the blocking of an I/O request which is the problem but rather the resumption of the processing. In the case of an I/O request, the block device driver transfers a reference to a storage area which contains all the necessary information for the scheduler. This also includes a reference which recursively refers to the function in the driver that requests a request and can be used in order to trigger the driver. If an I/O request now needs to be blocked and hence a ZERO reference is returned to the driver function, instead of the requested request, the handle on the transferred structure must imperatively be retained, since otherwise the I/O scheduler is no longer able to trigger the driver. The circumstance that for each of the existing instances this reference self-evidently refers to another storage area with individual information, but all instances show only one global storage area, this handle needs to be kept outside the global storage area. This is possible only within an individual kernel thread, with any forms of kernel threads in turn requiring a reference. Forms mean the predefined kernel threads provided in the kernel, such as work queues. The only type of kernel threads which do not need to be triggered via a reference is timer objects. At this juncture, the emphasis is expressly on triggering, since timer objects naturally also require a handle for initialization and deinitialization, but trigger themselves as a result of the timeout elapsing, as it were.

The use of timer objects allows the implementation of a polling mechanism which recursively triggers the driver on the basis of the prescribed timer timeout. The use of a polling mechanism does not cause any significant latency. In the worst case, a delay of one millisecond arises which is negligible when measured using the processing time (for example 200 milliseconds for five active clients).

FIG. 13 shows a flowchart for a delay mechanism in a local DIOS scheduler.

The flowchart starts at the input 1301 with elv_next_req (*q). Step 1302 involves a check to determine whether there is a block. If this is not the case, the process branches to step 1303, which means return q→req. In the other case, the process branches to step 1304 init_timer(*q). From there, the process can continue either to a queue 1305 or to step 1306 "return ZERO". From the queue 1305, the process is transferred to step 1302 again with "q→elv_next_req(*q)".

FIG. 13 shows only the essential parts which are necessary for explaining the delay mechanism. In addition, the naming of the functions and of the transferred structure can be regarded as exemplary and does not correspond to the actual facts and circumstances.

The idle state describes the blocking behavior of the DIOS-LS 121 (cf. FIG. 12) when the client has not made any I/O requests. The client stays in this state until an application accesses the storage area network. The scheduler withholds the requests and sends an APPLY_REQ message to the DIOS-GS 124. The scheduler then changes to the busy state, which is presented in the next section.

The busy state indicates that a request is in the queue and has been blocked. In this state, no further APPLY_REQ messages are sent to the global scheduler, but rather it is waited until the requests which are in the queue can be processed. In this state, polling is performed in continuous intervals (1 ms) and a check is performed to determine whether the DIOS-GS 124 has granted the permission for processing. If this permission does not arrive after a variably definable number of polling intervals (default 10000), the scheduler passes the requests to the driver and changes to the NOOP mode.

This mode of operation behaves in exactly the same way as an NOOP scheduler and is therefore also called NOOP mode. In NOOP mode, no I/O requests are blocked, which means that the scheduler is always in the nonblocking state. When the module has been loaded, the scheduler is in this mode. In addition, the scheduler reverts to this mode in the event of a serious error. This ensures that when the system misbehaves, for example the DIOS server 123 crashes, the individual clients at least have access to the storage area network. The scheduler can also be put explicitly into this mode by the global scheduler 124. By way of example, this happens when the global scheduler is unloaded.

In scheduling operation, the local scheduler (DIOS-LS 121) is initially always in the blocking state. Only the permission from the superordinate scheduler prompts the DIOS-LS 121 to forward I/O requests to the block device driver for a defined period. The permission is transferred to the client in the form of a token. When the timeslice has elapsed, the scheduler reverts to the blocking state again and returns the token to the server.

Scheduling operation is again divided into two types: best-effort mode and realtime mode.

The best-effort mode is used when the application 120 (cf. FIG. 12) has not requested a minimum bandwidth. The scheduler passes through the I/O requests until the timeslice has elapsed, and it then changes to the blocking state again. A second termination criterion ensures that when all I/O requests within a timeslice have been processed, there is no unnecessary waiting until the timeslice has elapsed: what is known as the idle timer. The idle timer is always reinitialized upon activity, that is to say as soon as a request is allocated by the file system or re-sorted by the elevator. If the scheduler is inactive over a variably definable period (default 30 ms) the token is returned to the global I/O scheduler.

The realtime mode is used when an application 120 (cf. FIG. 12) has brokered a fixed bandwidth. The fundamental behavior is the same as that of the best-effort mode with the exception that the time slot cannot be terminated by the idle timer. Instead, additional flow control is used which is appropriate on the basis of the semantic knowledge of the requested bandwidth. The scheduler sums the volume of data in each I/O request and terminates the time slot as soon as the transferred volume of data within the time slot corresponds to the brokered bandwidth.

Since the properties of the individual states have been explained above, FIG. 14 shows the interplay and the transitions of the states. It shows a schematic illustration of a state machine in a local DIOS scheduler 121 (cf. FIG. 12).

In the best-effort 1401, realtime 1402 and NOOP mode states, I/O requests are processed. For the sake of clarity, FIG. 14 does not show all transitions to the NOOP mode. Transition to the NOOP mode is possible from any of the four states.

The DIOS client 122 (cf. FIG. 12) is used as a network interface for the local I/O schedulers 121 and undertakes the implementation of the protocol presented above. In addition, in contrast to the local I/O schedulers 121, there is only one instance of the client, which means that the DIOS client 122 is the control sector within a client system. On account of the fact that the client accesses functions of the local I/O scheduler 121, the DIOS-LS module needs to be loaded first of all. The module dependency is checked by the operating system call ("insmod") and returns an error message if the DIOS-LS module has not been loaded.

A further state 1404 is the "Blocked Idle" state. From this state, there is a transition to a state 1405 "Blocked Busy" at the transition 1406. The transition 1406 follows in the event of an I/O request from the driver/signaling and a token will be requested from the global scheduler instance. If no token has been received within state 1405 (timeout), there is a transition from state 1405 to the state 1403 at the transition 1407. When a token is received, there is a transition from the state 1405 either to the state 1401 or to the state 1402. The transition 1408 is made for "token received/start idle timer"; the transition 1409 to the state 1402 is made for "token received/volume of data=0", also referred to as "reset byte count". From the transition 1410 from the state 1401 to the state 1404 takes place for "time slot over" or "timeout", and a transition 1411 from the state 1402 to the state 1404 occurs for "time slot over" or "volume of data reached". A transition 1412 "goto noop" is exemplary shown between states 1404 and 1403. This transition is possible from all states and acts as a fallback mechanism. A transition 1413 "init dios" is shown from state 1403 to state 1404 and is the starting point of the state machine.

FIG. 15 shows a schematic illustration of a state machine in a DIOS client 122 (cf. FIG. 12).

The disconnect state 1401 is the initial state following successful loading of the module. The client attempts to set up a link to the DIOS server within this state. If this is unsuccessful, a fresh attempt is started at continuous intervals. This is shown in the transition 1511 "Server cannot be contacted—fresh attempt". So long as the client is not connected to the server, the DIOS-LS 121 is put into the NOOP mode. The registration with the DIOS server 123 contains the information about the data rate of the physical link by the client.

Following successful registration, transition 1512, the DIOS client 122 is in the idle state 1502. In this state, messages are received from the server and are processed in the form of function calls within the DIOS-LS. The acknowledgement by the DIOS-LS 121 is provided asynchronously using a callback mechanism, which is explained in more detail in the next section.

The wait state 1503 serves to provide a better overview, because the asynchronous interface between DIOS-LS 121 and the DIOS client 122 means that there is no real wait state. There is no need, since the local I/O scheduler 121 definitively provides an acknowledgement. The only case which would result in it not doing this is a system crash, where this case needs to be handled by the server. In addition, the local scheduler must always have the opportunity to send a message, for example when a new request has accrued in the queue.

At the transition 1513 "Command received-function call", there is a transition from the state 1502 to the state 1503. At the transition 1514 "callback from the DIOS-LS—send message to the server", there is a transition from the state 1503 to the state 1502, and at transition 1515 "connection lost—set DIOS-LS to NOOP", there is a transition from the state 1502 to the state 1501. At the transition 1516 "DIOS-LS not present", there is a transition from the state 1501 to the final state 1504. The entry point 1517 to the state 1501 occurs at "insmod—set DIOS-LS to NOOP".

The DIOS server 123 of the distributed I/O scheduling framework is the central communication unit. Interfaces for a distributed scheduler are provided which allow the individual clients to be coordinated. In addition, the server 123 undertakes organization of the individual connections and therefore provides a clear division between the actual scheduling algorithm and management tasks. The sections which follow explain the client management first of all and then discuss the modes of operation of the server, and finally explain the structure.

Each client that is registered with the server is mapped onto an object structure. All the essential properties of the client are held within this structure, such as IP address, socket reference or bandwidths. The individual client objects are managed in a global list.

The server has no module dependencies and can therefore operate even without the existence of a superordinate scheduler. The result of this is that two modes of operation are distinguished: standalone operation and scheduling operation.

Standalone operation allows a dynamic change of the DIOS-GS 124 (cf. FIG. 12) without the entire framework needing to be restarted. The server is in standalone operation following the loading process. In this mode of operation, incoming connections are accepted, inserted into the client list and then the client is put into the NOOP mode.

Scheduling operation presupposes a global scheduler which registers with the server. Registration is performed using an exported function which returns to the global scheduler a handle for the client list and, for synchronization purposes, a spinlock. Understandably, there may only ever be one global scheduler active, which means that if a further global scheduler attempts to perform registration in scheduling operation then it is rejected. Following the registration, all clients are put into the blocking mode.

FIG. 16 shows a flowchart for a DIOS server thread. Entry 1610 "insmod" is effected in the state 1601 "Idle". For an incoming connection, there is a transition from 1601 to step 1602 "init client object and thread" at the transition 1611 "incoming connection". From step 1602, there is a transition to step 1603, in which a check is performed to determine whether "dios-gs is registered". If this is not the case, the client is set to "NOOP" in step 1604 and the process continues to step 1601. If the response in step 1603 is positive, the process proceeds to step 1605 "break client" and then to step 1606 "callback to dios-gs", and from there to step 1601.

The manner of operation of the DIOS server 123 corresponds, in principle, to that of standalone operation, with the difference that the new client is not put into the NOOP mode, but rather into the blocking state. In addition, an acknowledgement is supplied to the global scheduler in a scheduling operation by means of a callback reference, which needs to be transferred by the global scheduler during registration.

The DIOS server 123 comprises a server thread, whose manner of operation is shown in FIG. 16, and a plurality of client threads (CT). The number of client threads is based on the number of registered clients, so that each client has an associated dedicated client thread. The server thread performs only structural changes on the client list. This means changes such as the insertion or deletion of client objects, not the change of values within the object. Excepted from this are initial values such as thread ID, IP address and socket reference, which are set once during the initialization of the client object. The individual client threads only have access to the attributes of their client. The client threads are used as pure reception routines which process the incoming messages from their client and signal to the global scheduler in scheduling operation that a new message has arrived. The information content of the message is transported using the attributes of the client object. That is to say that when a client has brokered a bandwidth, for example, this bandwidth is entered into the attribute wanted bw. Messages are sent from a third context, which is illustrated using exported functions.

FIG. 17 shows the design of the DIOS server module. It shows a DIOS-GS 1701, a client list 1702, a DIOS-SPI 1703, a server thread 1704, send 1705, a plurality of client threads CT1, CT2, ..., CTn, a network 1706 and the DIOS server 1707. The elements 1701, 1703, 1704, 1705, 1706, CT1, CT2, ..., CTn are kernel threads, and the shaded areas are static functions which are called as required. In addition, the operating cycle for a freshly incoming connection is shown.

FIG. 17 shows the following steps:
171: incoming connection from a client.
172: server thread allocates a new client object and inserts it into the client list.
173: server thread initializes a new client thread.
174: client thread receives the configuration packet and sets the containing attributes.
175: client thread signals the arrival of the message to the DIOS-GS.
176: the DIOS-GS reacts to incoming messages via the DIOS-SPI ("Scheduling Programmable Interface").
177: the DIOS-SPI translates the commands into the protocol and calls the transmission routine.
178: the transmission routine sends the message via the network.

In the case of clients which are already registered, steps 1 to 3 are dispensed with and the communication comprises steps 4 to 8. In standalone operation, steps 175 to 177 are dispensed with. Instead, the client is put into the NOOP mode directly by means of the transmission routine.

The previous sections represented the tools of the DIOS framework which are needed in order to allow distributed scheduling. The actual scheduling takes place in the DIOS global scheduler 124 (cf. FIG. 12). First of all, the manner of operation of the DIOS-GS 124 is explained below. Next, details such as modes of operation and the calculation of the timeslices and windows are discussed.

The scheduling is based on a timeslice method. Within a definable time frame (one second as standard), all clients which have registered the access to the SAN are assigned a timeslice. Within the frame, all newly arriving requests are collected and taken into account in the next frame.

FIG. 18 shows a flowchart for a global I/O scheduler (DIOS-GS 124; global I/O access controller).

Following the initialization, which means registration with the server and initialization of data structures, the scheduler is in the wait state 1801 (IDLE). This state is first left as soon as one of the clients makes an I/O request 1811. What is known as "rescheduling" 1802 is then performed, which calculates a timeslice for all clients which have made an I/O request. Next, the scheduling interval 1803, in which each client is assigned its timeslice in order, begins. When the frame has elapsed, a check is performed in step 1804 to determine whether at least one I/O request has been made during the scheduling interval. If this has not happened, the scheduler returns to the idle state 1801, otherwise "rescheduling" 1802 is performed.

A distinction is drawn between two types of mode of operation, each with two forms: firstly, a client-end mode of operation and secondly a scheduler-end mode of operation, the form of which may respectively be combined with one another. The client-end forms are similar to the two modes of scheduling operation of the local I/O scheduler: realtime mode and best-effort mode.

The forms of the server-end modes of operation provide coordination between performance and response time of the system: dynamic cycle-constant timeslice (DC-CT) and constant cycle-dynamic timeslice (CC-DT). These modes can be configured in ongoing operation using the Sys file system. The individual modes are explained briefly below.

The realtime mode is used for those clients which have requested a minimum bandwidth. The timeslice ($t_{slice}$) is obtained from the linkage of the client ($b_{client}$), which is ideally at least as large as the available bandwidth of the SAN ($bw_{san}$), requested bandwidth ($bw_{applied}$) and magnitude of the scheduling interval ($T_{cycle}$)

$$t_{slice} = \frac{bw_{applied}}{\min(bw_{client}, bw_{san})} \cdot T_{cycle}$$

The timeslice of a realtime client is reserved until the client releases the bandwidth again or an error occurs. The error situations are explained subsequently.

Each client that makes an I/O request and has not brokered any bandwidth is treated as a best-effort client. A BE client is only assigned a timeslice if it has registered a request. The available scheduling frame is split evenly over all BE clients ($b_j$) on the basis of their available bandwidth. In this case, the best-effort scheduling frame ($T_{BE-cycle}$) is obtained from the defined interval (one second as standard) minus the time slots of the realtime clients. The timeslot for a client ($t_{slice \mid i}$) calculates is therefore obtained as $$t_{slice \mid t} = \sum_{j=1}^{n} \left( \frac{t_{BE-cycle}}{\min(bw_{client \mid 1}, bw_{san})} \right) \cdot bw_{client \mid i}$$

The meaning of the variable n (number of BE clients) is explained in the next section.

As indicated in the previous section, the number of BE clients is not explicit. A distinction is drawn between active clients and registered clients.

When the number of all registered clients is taken as a basis for calculating the timeslices, the scheduler is in the Dynamic Cycle-Constant Timeslice mode. As the name already states, the timeslices remain constant, regardless of how many clients have made I/O requests at this instant. This results in the scheduling frame changing dynamically and the prescribed interval defining a maximum interval length. The advantage of this mode is that a frame is usually shorter and hence the system can react to alterations more quickly. A disadvantageous effect is that a client can operate sequentially for a shorter time, which has a negative effect on performance, since more head skips arise.

A mode operates with a constant scheduling interval and dynamically changing timeslices. In the worst case, a client must wait two scheduling intervals minus its timeslice until it is provided with access to the SAN. For this, the client has access to the SAN for a longer time on average. This mode is appropriate particularly for applications which do not require any realtime priority, such as render applications.

On account of the fact that a best-effort client needs to make a new request after the timeslice has elapsed, it may happen that the client which has the token last cannot make a new request in good time. Since systematic waiting times are to the detriment of performance, such waiting times need to be avoided. The scheduler therefore uses another mechanism so as not to permanently disadvantage the last client in a scheduling interval. The last client in the frame is provided with a flag. When the timeslice has elapsed, a check is performed to determine what percentage of its timeslice the relevant client has used. If the utilization level is above a freely definable value (80% as standard) or if a new request has been made, the client is provided with a timeslice in the next revolution.

To increase the efficiency of the system, the realtime clients are also monitored. Since the utilization level is not a criterion because the idle timer is inactive in realtime mode, a log is kept of how often a realtime client successively does not make a new request. As soon as a new request has been made, this counter is reset. If the counter exceeds a freely selectable value (ten as standard), the bandwidth is withdrawn from the client.

The quality of service (QoS) API (cf. reference symbol 125 in FIG. 12) of the DIOS framework forms the interface to the user space. It provides applications with functions which an application can use to request a fixed minimum bandwidth and to be released again. The text below briefly discusses the manner of operation of the interface. In this case, the consideration is limited to the asynchronous variant of the function dios_apply_bw_safe, which, in contrast to the synchronous variant, is able to return status messages to the application, for example when an error occurs following a successful request in the course of operation and the bandwidth can no longer be guaranteed. However, this requires a callback reference, inter alia, which needs to be transferred at the same time as the requesting.

The QoS-API communicates with the DIOS client via a netlink socket. It comprises exported functions which, in the safe variant, initialize a user space thread which, even after successful bandwidth allocation, monitors the netlink socket in case error messages arrive.

FIG. 19 shows a schematic illustration to explain a manner of operation of a DIOS-QoS-API (left). It shows an application 1901, a DIOS-QoS-API 1902, an API thread 1903, a DIOS client 1904 and a TCP 1905.

The following steps are shown:
191: application calls the API function and sends it a callback reference in addition to the bandwidth.
192: the function generates a message and sends it via a netlink socket.
193: a thread is initialized which waits for messages arriving from the netlink socket.
194: the thread ID of the API thread is returned to the application.
195: the DIOS client sends the request to the DIOS server.
196: the response is received and evaluated.
197: the client sends the acknowledgement via the netlink socket.
198: the API thread receives the message and returns a callback to the application.

The right-hand part of FIG. 19 shows the release of bandwidth. The manner of operation corresponds to that of the brokerage. It should be noted that the application needs to transfer the thread ID of the API thread during the API call, so that the API thread can be terminated. The path 191*b*, 192*b*, 193*b* printed in bold shows the advantage of the asynchronous variant, because only in this case is it possible to provide an acknowledgement in the case of an error in the application.

The framework previously described as an exemplary embodiment was used for a processing chain for digital video processing. One of the applications used is used productively in the film industry. This test shows that the DIOS framework is also suitable for practical use. In addition, the benefit of the framework under practical conditions will be demonstrated.

The processing of video sequences in the professional film industry comprises a multiplicity of steps. The start involves the material being acquired, which conceptually comprises three individual steps. A large portion of the film material that arises during a production passes through these steps, regardless of whether or not it is used in the final version. These work steps are therefore run through most frequently and are referred to as "Dailies Workflow" in the sector.

FIG. 20 shows a block diagram of a workflow.

First of all, the material is scanned from a roll of film and, in step 211, is written to the storage medium by means of a workstation ("Ingest" 201). This classical process is currently complemented by the recording of digitally acquired material from the first available cameras suitable for filming, for example Thomson Viper. This would then involve the content of a field recorder being copied to the storage system.

Next, a second workstation is used to verify the material read in and to subject it to standardized process steps ("Verify/Processing" 202). In step 212, the workstation therefore reads a video stream and writes the processed sequence to another area of the storage system in step 222. The necessary processing steps can nowadays be accomplished in realtime, in principle, using modern computer architectures, which means that the entire step is ideally performed in realtime. In practice, however, a human processor will perform this step only section by section in realtime.

Finally, the material is assessed again and recorded on an HD video recorder, for example 213. The reading-in and playback 203 of the material is imperatively subject to realtime requirements. For efficiency reasons, the processing step should be able to be performed in realtime. Overall, two read and two write video streams are therefore required as simultaneously as possible.

The following section describes the design of the workflow shown in FIG. 20 with the available means. The hardware components are discussed, and the software used for each processing step is presented. Finally, the configuration is explained. This includes both the parameters for recording and settings of the DIOS framework.

FIG. 21 shows an illustration of a test design for the workflow in FIG. 20.

The fundamental hardware components for the practical simulation of a Dailies Workflow comprise (cf. FIG. 21): three workstations 211, 212, 213, four displays 214, . . . , 217, three storage systems 281, 219, 2110, fiber channel SAN environment and a digital film camera 2111.

The "Ingest" is implemented directly by means of the digital film camera 2111 (Viper from Thomson Grass Valley). The Viper is a professional film camera which provides a native resolution of 1920×1080 pixels (full HD). The digital film camera 2111 records at a frame rate of up to thirty frames per second with a depth of color of 10 bits. The three workstations 211, 212, 213 (for "Ingest" 244, "Processing" 226, "Playout" 227) and the fiber channel SAN environment correspond to those which have also been used for the previous tests. The desktops of the workstations 211, 212, 213 are mapped onto a monitor by means of a KVM switch in order for a user to be able to present the workflow on three workstations. The three further displays are used for output of the HD-SDI signal, which is output via a video IO card for control purposes. Added to this is a third Linux PC, which acts as a metadata server for the StorNext file system and as a DIOS server.

Two applications are used for the video processing. The "Ingest" and the reproduction are implemented using the post production framework "Bones". The program package is used in the professional environment of post production and therefore underlines the practical relevance of this test design. The Bones framework has the property that as soon as a buffer "Underflow" or "Overflow" occurs, the recording or playback is stopped. The user is therefore immediately made aware of the problem and the process would need to be repeated. The "Processing" step is performed using a command-line-based program. The program dpxconv has been developed in the course of research work at Thomson Corporate Research and is used for developing GPU-based realtime image processing algorithms, such as local transformations or color corrections. The realtime performance and the fact that the program can be used via the command line have decided on the choice of the program. This results in a simplification when the experiment is performed.

The film material is recorded in full HD resolution (1920×1080) with a depth of color of 10 bits (RGB). The image rate is 30 frames per second, which means that a video stream requires a bandwidth of just under 250 MB/s. This corresponds to an aggregated data rate of 1 gigabyte per second which needs to be available to the three clients. The bandwidths have been brokered by means of the DIOS-QoS-API. This is necessary, since one of the clients requires twice the bandwidth for the two video streams. The DIOS framework accordingly operates in realtime mode with a scheduling interval of one second. The applications are configured such that internally fifty frame buffers per video stream are used. This compensates for fluctuations in the instantaneous data rate.

The experiment has been repeated several times. In this case, the recorded sequence is simultaneously used for documentation. The live image from the camera is shown on one of the three HD-SDI displays. The central monitor shows the desktop 225 for the three workstations. The image processing application is started with a time offset of just under 40 seconds. This serves to make sure that the images read are not still present in the cache of the RAID controller. This ensures that each process actually reads from the hard disks of the storage system. The processed material continues to be displayed on a control monitor (top right) at the same time during the processing. After a further time offset, a Bones instance is started on the third workstation and plays back the processed material and outputs it on the right-hand display again. During the whole process, the scheduling can be tracked using the light-emitting diodes of the fiber channel switch. It is clearly possible to see the timeslices of different length and the scheduling cycle. The light emitting diodes of the storage systems signal that the hard disks are actually being accessed.

None of the experiments have encountered any interruption to the video streams. One of these test passes has been documented by means of a film. The Bones framework has not registered an error, and the processed material contains all the images of the original material. Further experiments with four workstations, for example, which reproduce different film sequences via Bones, have confirmed the results. Finally, the SAN environment has been reconfigured such that each client accesses the storage system using three fiber channel ports instead of six. This means that the bandwidth of the storage system is limited to 1200 MB/s by the fiber channel link. In this configuration, it is likewise possible to play back four parallel video streams. The video material has been reproduced in HD resolution at 30 frames per second, which—in view of data rate—corresponds to approximately five video streams with 25 frames per second. The results show that the DIOS framework can be used to utilize almost the theoretical performance capability of the storage system.

Using the example of the workflow presented in FIG. 20, which is relevant in practice, the DIOS framework with the same equipment can be used to parallelize the processing chain. In comparison with the conventional means, the three processing steps would need to be performed sequentially given the same equipment. For this reason, the DIOS framework results in a possible reduction in the processing time by the factor three.

The features of the invention which are disclosed in the description above, in the claims and in the drawing may be of significance either individually or in any combination for implementing the invention in its various embodiments.

The invention claimed is:

1. A method for controlling an access by a plurality of applications, which are respectively implemented as an application client in an operating system environment of a data processing device, to a shared storage system which is mapped in the operating system environment in the form of a plurality of storage blocks which are respectively associated with one of the application clients, the method including:
    each storage block being assigned a local I/O access controller which is configured to block or allow access by the associated application client to the storage block,
    local I/O access controllers which are respectively associated with the same application client being assigned to a local client for flow control which is configured to put the local I/O access controllers which are associated with the same application client into an "access permitted" state or an "access blocked" state together,
    the operating system environment having a global I/O access controller formed in it which is configured to transmit control information to the local clients for flow control, and
    an I/O access operation by the application clients to one or more of the storage blocks in the shared storage system being regulated globally in line with a temporal flow pattern by virtue of the local clients for flow control putting the local I/O access controllers which are associated with the same application client into the "access permitted" state or the "access blocked" state together in line with the control information which is received by the local clients for flow control from the global I/O access controller.

2. The method as claimed in claim 1, wherein the control information is used within the context of the temporal flow pattern to assign the local clients for flow control at least one respective temporal access window in which the local I/O access controllers which are associated with the same application client, and which are otherwise in the "access blocked" state, are then put into the "access permitted" state together.

3. The method as claimed in claim 2, wherein the control information is used within the context of the temporal flow pattern to assign the local clients for flow control respective temporal access windows of the same length.

4. The method as claimed in claim 2, wherein the control information is used within the context of the temporal flow pattern to assign the local clients for flow control temporal access windows in line with a respective requested proportion of a total access width.

5. The method as claimed in claim 2, wherein the control information is used within the context of the temporal flow pattern to assign the local clients for flow control temporal access windows in line with service quality requests previously negotiated between the application clients.

6. The method as claimed in claim 2, wherein the temporal access window respectively associated with the local clients for flow control is terminated if inactivity in the associated application client is detected.

7. The method as claimed in claim 1, wherein the local I/O access controllers are respectively formed as a module which can be loaded at runtime.

8. The method as claimed in claim 1, wherein each local client for flow control is assigned local I/O access controllers which are associated not only with the same application client but also with storage blocks in a single file system.

9. The method as claimed in claim 1, wherein the operating system environment has a further global I/O access controller formed in it which operates in line with the manner of operation of the global I/O access controller and globally regulates the access to a further shared storage system which is optionally implemented in the data processing device in line with the shared storage system.

10. An apparatus for controlling an access by a plurality of applications, which are respectively implemented as an application client in an operating system environment for a data processing device, to a shared storage system which is mapped in the operating system environment in the form of a plurality of storage blocks which are respectively associated with one of the application clients, wherein the apparatus has:

local I/O access controllers formed which are respectively associated with a storage block, wherein the local I/O access controllers are configured to block or allow access by the associated application client to the storage block, local clients for flow control formed which respectively have associated local I/O access controllers for the same application client, wherein the local clients for flow control are configured to put the local I/O access controllers which are associated with the same application client into an "access permitted" state or an "access blocked" state together, a global I/O access controller formed in the operating system environment, said global I/O access controller being configured to transmit control information to the local clients for flow control, and an I/O access operation by the application clients to one or more storage blocks, which are respectively associated with the application clients in the shared storage system regulated globally in line with a temporal flow pattern by virtue of the local clients for flow control putting the local I/O access controllers which are associated with the same application client into the "access permitted" state or the "access blocked" state together in line with the control information which is received by the local clients for flow control from the global I/O access controller.

11. The apparatus of claim 10, wherein the local I/O access controllers are respectively formed as a module which can be loaded at runtime.

12. The apparatus of claim 10, wherein each local client for flow control is assigned local I/O access controllers which are associated not only with the same application client but also with storage blocks in a single file system.

13. The apparatus of claim 10, wherein the operating system environment has a further global I/O access controller formed in it which operates in line with the manner of operation of the global I/O access controller and globally regulates the access to a further shared storage system which is optionally implemented in the data processing device in line with the shared storage system.

* * * * *

UNITED STATES PATENT AND TRADEMARK OFFICE
CERTIFICATE OF CORRECTION

Page 1 of 1

PATENT NO. : 8,019,915 B2
APPLICATION NO. : 12/450853
DATED : September 13, 2011
INVENTOR(S) : Fuerst et al.

It is certified that error appears in the above-identified patent and that said Letters Patent is hereby corrected as shown below:

Title page in the Inventors Section (75), the last name of the second listed inventor should be spelled --Einhorn--.

Signed and Sealed this
Twenty-second Day of November, 2011

David J. Kappos
*Director of the United States Patent and Trademark Office*